US012602842B2

(12) United States Patent
Ahafonov et al.

(10) Patent No.: US 12,602,842 B2
(45) Date of Patent: Apr. 14, 2026

(54) TEXTURE GENERATION USING MULTIMODAL EMBEDDINGS

(71) Applicant: Snap Inc., Santa Monica, CA (US)

(72) Inventors: Bohdan Ahafonov, Santa Monica, CA (US); Matthew Hallberg, Los Angeles, CA (US); Sergei Korolev, Marina del Rey, CA (US); William Miles Miller, San Francisco, CA (US); Daria Skrypnyk, Los Angeles, CA (US); Aleksei Stoliar, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 44 days.

(21) Appl. No.: 18/529,550

(22) Filed: Dec. 5, 2023

(65) Prior Publication Data

US 2024/0355010 A1 Oct. 24, 2024

Related U.S. Application Data

(60) Provisional application No. 63/460,205, filed on Apr. 18, 2023.

(51) Int. Cl.
*G06T 11/00* (2006.01)
*G06T 7/11* (2017.01)
(Continued)

(52) U.S. Cl.
CPC .............. *G06T 11/001* (2013.01); *G06T 7/11* (2017.01); *G06T 11/40* (2013.01); *G06T 11/60* (2013.01);
(Continued)

(58) Field of Classification Search
CPC .......... G06T 11/001; G06T 7/11; G06T 11/40; G06T 11/60; G06T 2210/16; G06V 20/20; G10L 15/08; G10L 15/22; G10L 2015/088
(Continued)

(56) References Cited

U.S. PATENT DOCUMENTS

| | | |
|---|---|---|
| 5,604,843 A | 2/1997 | Shaw et al. |
| 5,689,559 A | 11/1997 | Park |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

"U.S. Appl. No. 18/420,546, Examiner Interview Summary mailed Jan. 22, 2025", 2 pgs.

(Continued)

*Primary Examiner* — David T Welch

(74) *Attorney, Agent, or Firm* — Schwegman Lundberg & Woessner, P.A.

(57) ABSTRACT

Methods and systems are disclosed for generating an extended reality (XR) try-on experience. The methods and systems store, in a multimodal memory, interaction data representing use of one or more interaction functions including data in different modalities. The methods and systems detect an object depicted in an image captured by an interaction client and generate, by a machine learning model, a prompt based on the object depicted in the image and the interaction data in the multimodal memory. The methods and systems generate an artificial texture based on (Continued)

the prompt and modify a texture of the object depicted in the image using the artificial texture that has been generated based on the prompt.

19 Claims, 12 Drawing Sheets

(51) Int. Cl.
| | |
|---|---|
| *G06T 11/40* | (2006.01) |
| *G06T 11/60* | (2006.01) |
| *G06V 20/20* | (2022.01) |
| *G10L 15/08* | (2006.01) |
| *G10L 15/22* | (2006.01) |

(52) U.S. Cl.
CPC .............. *G06V 20/20* (2022.01); *G10L 15/08* (2013.01); *G10L 15/22* (2013.01); *G06T 2210/16* (2013.01); *G10L 2015/088* (2013.01)

(58) Field of Classification Search
USPC ........................................ 345/582
See application file for complete search history.

(56) References Cited

U.S. PATENT DOCUMENTS

| | | | |
|---|---|---|---|
| 5,880,731 A | | 3/1999 | Liles et al. |
| 6,023,270 A | | 2/2000 | Brush, II et al. |
| RE36,919 E | | 10/2000 | Park |
| RE37,052 E | | 2/2001 | Park |
| 6,223,165 B1 | | 4/2001 | Lauffer |
| 6,650,793 B1 | | 11/2003 | Lund et al. |
| 6,772,195 B1 | | 8/2004 | Hatlelid et al. |
| 6,804,417 B1 | | 10/2004 | Lund et al. |
| 6,842,779 B1 | | 1/2005 | Nishizawa |
| 7,342,587 B2 | | 3/2008 | Danzig et al. |
| 7,468,729 B1 | | 12/2008 | Levinson |
| 7,636,755 B2 | | 12/2009 | Blattner et al. |
| 7,639,251 B2 | | 12/2009 | Gu et al. |
| 7,775,885 B2 | | 8/2010 | Van et al. |
| 7,859,551 B2 | | 12/2010 | Bulman et al. |
| 7,885,931 B2 | | 2/2011 | Seo et al. |
| 7,925,703 B2 | | 4/2011 | Dinan et al. |
| 8,088,044 B2 | | 1/2012 | Tchao et al. |
| 8,095,878 B2 | | 1/2012 | Bates et al. |
| 8,108,774 B2 | | 1/2012 | Finn et al. |
| 8,117,281 B2 | | 2/2012 | Robinson et al. |
| 8,130,219 B2 | | 3/2012 | Fleury et al. |
| 8,146,005 B2 | | 3/2012 | Jones et al. |
| 8,151,191 B2 | | 4/2012 | Nicol |
| RE43,993 E | | 2/2013 | Park |
| 8,384,719 B2 | | 2/2013 | Reville et al. |
| RE44,054 E | | 3/2013 | Kim |
| RE44,068 E | | 3/2013 | Park |
| RE44,106 E | | 3/2013 | Park |
| 8,396,708 B2 | | 3/2013 | Park et al. |
| RE44,121 E | | 4/2013 | Park |
| 8,425,322 B2 | | 4/2013 | Gillo et al. |
| 8,458,601 B2 | | 6/2013 | Castelli et al. |
| 8,462,198 B2 | | 6/2013 | Lin et al. |
| 8,484,158 B2 | | 7/2013 | Deluca et al. |
| 8,495,503 B2 | | 7/2013 | Brown et al. |
| 8,495,505 B2 | | 7/2013 | Smith et al. |
| 8,504,926 B2 | | 8/2013 | Wolf |
| 8,559,980 B2 | | 10/2013 | Pujol |
| 8,564,621 B2 | | 10/2013 | Branson et al. |
| 8,564,710 B2 | | 10/2013 | Nonaka et al. |
| 8,581,911 B2 | | 11/2013 | Becker et al. |
| 8,597,121 B2 | | 12/2013 | del Valle |
| 8,601,051 B2 | | 12/2013 | Wang |
| 8,601,379 B2 | | 12/2013 | Marks et al. |
| 8,632,408 B2 | | 1/2014 | Gillo et al. |
| 8,648,865 B2 | | 2/2014 | Dawson et al. |
| 8,659,548 B2 | | 2/2014 | Hildreth |
| 8,683,354 B2 | | 3/2014 | Khandelwal et al. |
| 8,692,830 B2 | | 4/2014 | Nelson et al. |
| 8,810,513 B2 | | 8/2014 | Ptucha et al. |
| 8,812,171 B2 | | 8/2014 | Filev et al. |
| 8,832,201 B2 | | 9/2014 | Wall |
| 8,832,552 B2 | | 9/2014 | Arrasvuori et al. |
| 8,839,327 B2 | | 9/2014 | Amento et al. |
| 8,890,926 B2 | | 11/2014 | Tandon et al. |
| 8,892,999 B2 | | 11/2014 | Nims et al. |
| 8,924,250 B2 | | 12/2014 | Bates et al. |
| 8,963,926 B2 | | 2/2015 | Brown et al. |
| 8,989,786 B2 | | 3/2015 | Feghali |
| 9,086,776 B2 | | 7/2015 | Ye et al. |
| 9,105,014 B2 | | 8/2015 | Collet et al. |
| 9,241,184 B2 | | 1/2016 | Weerasinghe |
| 9,256,860 B2 | | 2/2016 | Herger et al. |
| 9,298,257 B2 | | 3/2016 | Hwang et al. |
| 9,314,692 B2 | | 4/2016 | Konoplev et al. |
| 9,330,483 B2 | | 5/2016 | Du et al. |
| 9,357,174 B2 | | 5/2016 | Li et al. |
| 9,361,510 B2 | | 6/2016 | Yao et al. |
| 9,378,576 B2 | | 6/2016 | Bouaziz et al. |
| 9,402,057 B2 | | 7/2016 | Kaytaz et al. |
| 9,412,192 B2 | | 8/2016 | Mandel et al. |
| 9,460,541 B2 | | 10/2016 | Li et al. |
| 9,489,760 B2 | | 11/2016 | Li et al. |
| 9,503,845 B2 | | 11/2016 | Vincent |
| 9,508,197 B2 | | 11/2016 | Quinn et al. |
| 9,532,364 B2 | | 12/2016 | Fujito |
| 9,544,257 B2 | | 1/2017 | Ogundokun et al. |
| 9,576,400 B2 | | 2/2017 | Van Os et al. |
| 9,589,357 B2 | | 3/2017 | Li et al. |
| 9,592,449 B2 | | 3/2017 | Barbalet et al. |
| 9,648,376 B2 | | 5/2017 | Chang et al. |
| 9,697,635 B2 | | 7/2017 | Quinn et al. |
| 9,706,040 B2 | | 7/2017 | Kadirvel et al. |
| 9,744,466 B2 | | 8/2017 | Fujioka |
| 9,746,990 B2 | | 8/2017 | Anderson et al. |
| 9,749,270 B2 | | 8/2017 | Collet et al. |
| 9,792,714 B2 | | 10/2017 | Li et al. |
| 9,839,844 B2 | | 12/2017 | Dunstan et al. |
| 9,883,838 B2 | | 2/2018 | Kaleal, III et al. |
| 9,898,849 B2 | | 2/2018 | Du et al. |
| 9,911,073 B1 | | 3/2018 | Spiegel et al. |
| 9,936,165 B2 | | 4/2018 | Li et al. |
| 9,959,037 B2 | | 5/2018 | Chaudhri et al. |
| 9,980,100 B1 | | 5/2018 | Charlton et al. |
| 9,990,373 B2 | | 6/2018 | Fortkort |
| 10,039,988 B2 | | 8/2018 | Lobb et al. |
| 10,052,026 B1 * | | 8/2018 | Tran ...................... A61B 5/165 |
| 10,097,492 B2 | | 10/2018 | Tsuda et al. |
| 10,116,598 B2 | | 10/2018 | Tucker et al. |
| 10,155,168 B2 | | 12/2018 | Blackstock et al. |
| 10,158,589 B2 | | 12/2018 | Collet et al. |
| 10,242,477 B1 | | 3/2019 | Charlton et al. |
| 10,242,503 B2 | | 3/2019 | McPhee et al. |
| 10,262,250 B1 | | 4/2019 | Spiegel et al. |
| 10,282,914 B1 * | | 5/2019 | Tran ...................... A61B 5/1036 |
| 10,348,662 B2 | | 7/2019 | Baldwin et al. |
| 10,362,219 B2 | | 7/2019 | Wilson et al. |
| 10,432,559 B2 | | 10/2019 | Baldwin et al. |
| 10,454,857 B1 | | 10/2019 | Blackstock et al. |
| 10,475,225 B2 | | 11/2019 | Park et al. |
| 10,504,266 B2 | | 12/2019 | Blattner et al. |
| 10,573,048 B2 | | 2/2020 | Ni et al. |
| 10,608,966 B1 | | 3/2020 | Landowski et al. |
| 10,656,797 B1 | | 5/2020 | Alvi et al. |
| 10,657,695 B2 | | 5/2020 | Chand et al. |
| 10,657,701 B2 | | 5/2020 | Osman et al. |
| 10,750,019 B1 | | 8/2020 | Petrovykh et al. |
| 10,762,174 B2 | | 9/2020 | Denton et al. |
| 10,777,021 B2 * | | 9/2020 | Aluru ...................... G06F 16/54 |
| 10,805,248 B2 | | 10/2020 | Luo et al. |
| 10,872,451 B2 | | 12/2020 | Sheth et al. |
| 10,878,008 B1 | | 12/2020 | Cannon et al. |
| 10,880,246 B2 | | 12/2020 | Baldwin et al. |
| 10,895,964 B1 | | 1/2021 | Grantham et al. |
| 10,896,534 B1 | | 1/2021 | Smith et al. |
| 10,933,311 B2 | | 3/2021 | Brody et al. |

(56)        References Cited

U.S. PATENT DOCUMENTS

| | | | |
|---|---|---|---|
| 10,938,758 B2 | 3/2021 | Allen et al. | |
| 10,964,082 B2 | 3/2021 | Amitay et al. | |
| 10,979,752 B1 | 4/2021 | Brody et al. | |
| 10,984,575 B2 | 4/2021 | Assouline et al. | |
| 10,992,619 B2 | 4/2021 | Antmen et al. | |
| 11,010,022 B2 | 5/2021 | Alvi et al. | |
| 11,030,789 B2 | 6/2021 | Chand et al. | |
| 11,036,781 B1 | 6/2021 | Baril et al. | |
| 11,063,891 B2 | 7/2021 | Voss | |
| 11,069,103 B1 | 7/2021 | Blackstock et al. | |
| 11,080,917 B2 | 8/2021 | Monroy-hernández et al. | |
| 11,128,586 B2 | 9/2021 | Al Majid et al. | |
| 11,188,190 B2 | 11/2021 | Blackstock et al. | |
| 11,189,070 B2 | 11/2021 | Jahangiri et al. | |
| 11,199,957 B1 | 12/2021 | Alvi et al. | |
| 11,218,433 B2 | 1/2022 | Baldwin et al. | |
| 11,229,849 B2 | 1/2022 | Blackstock et al. | |
| 11,245,658 B2 | 2/2022 | Grantham et al. | |
| 11,249,614 B2 | 2/2022 | Brody | |
| 11,263,254 B2 | 3/2022 | Baril et al. | |
| 11,270,491 B2 | 3/2022 | Monroy-Hernández et al. | |
| 11,284,144 B2 | 3/2022 | Kotsopoulos et al. | |
| 12,149,864 B1 | 11/2024 | Zhou et al. | |
| 12,340,480 B2 | 6/2025 | Zhi et al. | |
| 12,400,406 B2 | 8/2025 | Xiao et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0169195 A1 | 7/2010 | Trest | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2013/0080928 A1 | 3/2013 | Zhuang et al. | |
| 2013/0103760 A1 | 4/2013 | Golding et al. | |
| 2013/0201187 A1 | 8/2013 | Tong et al. | |
| 2013/0249948 A1 | 9/2013 | Reitan | |
| 2013/0257877 A1 | 10/2013 | Davis | |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0164305 A1 | 6/2014 | Lynch et al. | |
| 2014/0176565 A1* | 6/2014 | Adeyoola | G06F 18/22 |
| | | | 345/473 |
| 2015/0206349 A1 | 7/2015 | Rosenthal et al. | |
| 2016/0134840 A1 | 5/2016 | Mcculloch | |
| 2016/0234149 A1 | 8/2016 | Tsuda et al. | |
| 2016/0378861 A1 | 12/2016 | Eledath et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0169476 A1 | 6/2017 | Nomula et al. | |
| 2017/0199855 A1 | 7/2017 | Fishbeck | |
| 2017/0206691 A1* | 7/2017 | Harrises | G02B 27/0172 |
| 2017/0235848 A1 | 8/2017 | Van Dusen et al. | |
| 2017/0250930 A1 | 8/2017 | Ben-itzhak | |
| 2017/0310934 A1 | 10/2017 | Du et al. | |
| 2017/0312634 A1 | 11/2017 | Ledoux et al. | |
| 2017/0353404 A1 | 12/2017 | Hodge | |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0198743 A1 | 7/2018 | Blackstock et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0035149 A1 | 1/2019 | Chen et al. | |
| 2019/0043106 A1 | 2/2019 | Talmor et al. | |
| 2019/0050427 A1 | 2/2019 | Wiesel et al. | |
| 2019/0057616 A1 | 2/2019 | Cohen et al. | |
| 2019/0073197 A1 | 3/2019 | Collins | |
| 2019/0097958 A1 | 3/2019 | Collet et al. | |
| 2019/0143527 A1 | 5/2019 | Favis et al. | |
| 2019/0147366 A1 | 5/2019 | Sankaran et al. | |
| 2019/0171845 A1 | 6/2019 | Dotan-Cohen et al. | |
| 2019/0188920 A1 | 6/2019 | Mcphee et al. | |
| 2019/0193273 A1 | 6/2019 | Favis et al. | |
| 2019/0236222 A1* | 8/2019 | Allen | G06F 1/163 |
| 2019/0244407 A1* | 8/2019 | Wiesel | G06V 10/255 |
| 2019/0280997 A1 | 9/2019 | Baldwin et al. | |
| 2019/0317709 A1 | 10/2019 | Sugimoto et al. | |
| 2019/0340485 A1 | 11/2019 | Ngo et al. | |
| 2019/0371028 A1* | 12/2019 | Harrises | G02B 27/0101 |
| 2020/0013232 A1* | 1/2020 | Kwai | G06T 13/40 |
| 2020/0013233 A1* | 1/2020 | Kwai | G06T 17/20 |
| 2020/0082607 A1 | 3/2020 | Degtyarev et al. | |
| 2020/0104653 A1 | 4/2020 | Solomon et al. | |
| 2020/0125678 A1 | 4/2020 | Conley et al. | |
| 2020/0143447 A1 | 5/2020 | Wang et al. | |
| 2020/0202579 A1 | 6/2020 | Caballero et al. | |
| 2020/0242305 A1 | 7/2020 | Wu | |
| 2020/0306637 A1 | 10/2020 | Baldwin et al. | |
| 2020/0342874 A1 | 10/2020 | Teserra et al. | |
| 2020/0372127 A1 | 11/2020 | Denton et al. | |
| 2020/0410575 A1 | 12/2020 | Grantham et al. | |
| 2021/0065705 A1 | 3/2021 | Ham et al. | |
| 2021/0074047 A1 | 3/2021 | Sheth et al. | |
| 2021/0089179 A1 | 3/2021 | Grantham et al. | |
| 2021/0104087 A1 | 4/2021 | Smith et al. | |
| 2021/0136019 A1 | 5/2021 | Price et al. | |
| 2021/0150806 A1 | 5/2021 | Guler et al. | |
| 2021/0168108 A1 | 6/2021 | Antmen et al. | |
| 2021/0170270 A1 | 6/2021 | Brody et al. | |
| 2021/0192823 A1 | 6/2021 | Amitay et al. | |
| 2021/0209825 A1 | 7/2021 | Assouline et al. | |
| 2021/0225058 A1 | 7/2021 | Chand et al. | |
| 2021/0240315 A1 | 8/2021 | Alvi et al. | |
| 2021/0243482 A1 | 8/2021 | Baril et al. | |
| 2021/0243503 A1 | 8/2021 | Kotsopoulos et al. | |
| 2021/0266277 A1 | 8/2021 | Allen et al. | |
| 2021/0281897 A1 | 9/2021 | Brody et al. | |
| 2021/0285774 A1 | 9/2021 | Collins et al. | |
| 2021/0295203 A1 | 9/2021 | Liao et al. | |
| 2021/0297498 A1 | 9/2021 | Divakaran et al. | |
| 2021/0306290 A1 | 9/2021 | Voss | |
| 2021/0306451 A1 | 9/2021 | Heikkinen et al. | |
| 2021/0385180 A1 | 12/2021 | Al Majid et al. | |
| 2021/0405831 A1 | 12/2021 | Mourkogiannis et al. | |
| 2021/0409535 A1 | 12/2021 | Mourkogiannis et al. | |
| 2022/0012929 A1 | 1/2022 | Blackstock et al. | |
| 2022/0058347 A1 | 2/2022 | Singaraju et al. | |
| 2022/0067296 A1 | 3/2022 | Singh Bawa et al. | |
| 2022/0114751 A1 | 4/2022 | Kannan et al. | |
| 2022/0199079 A1 | 6/2022 | Hanson et al. | |
| 2022/0210098 A1 | 6/2022 | Zhang et al. | |

(56)                References Cited

U.S. PATENT DOCUMENTS

| | | | |
|---|---|---|---|
| 2022/0237368 A1 | 7/2022 | Tran | |
| 2022/0327608 A1* | 10/2022 | Assouline | G06V 40/161 |
| 2023/0037894 A1 | 2/2023 | Arya et al. | |
| 2023/0059979 A1 | 2/2023 | Sharma et al. | |
| 2023/0078483 A1* | 3/2023 | Berger | G06T 7/11 |
| | | | 345/589 |
| 2023/0101374 A1 | 3/2023 | Kosecoff | |
| 2023/0103125 A1* | 3/2023 | Berger | G06Q 30/0641 |
| | | | 345/419 |
| 2023/0111489 A1 | 4/2023 | Zohar et al. | |
| 2023/0115551 A1 | 4/2023 | Jin et al. | |
| 2023/0116652 A1* | 4/2023 | Berger | G06T 7/90 |
| | | | 345/633 |
| 2023/0126177 A1 | 4/2023 | Xu et al. | |
| 2023/0245350 A1 | 8/2023 | Webber et al. | |
| 2023/0252747 A1* | 8/2023 | Meador | G06T 15/04 |
| | | | 345/419 |
| 2023/0274743 A1 | 8/2023 | Scherer et al. | |
| 2024/0029358 A1* | 1/2024 | Sharma | G06T 17/205 |
| 2024/0113990 A1 | 4/2024 | Palraj et al. | |
| 2024/0135662 A1* | 4/2024 | Zhang | G06T 19/006 |
| 2024/0161423 A1* | 5/2024 | Sholl | G06V 10/24 |
| 2024/0163232 A1 | 5/2024 | Jayaraman et al. | |
| 2024/0169622 A1 | 5/2024 | Xie et al. | |
| 2024/0192766 A1* | 6/2024 | Furtwangler | G06F 3/011 |
| 2024/0202796 A1* | 6/2024 | Sadr | G06Q 30/0643 |
| 2024/0211826 A1 | 6/2024 | Rewerenda et al. | |
| 2024/0242267 A1* | 7/2024 | Shingler | G06Q 30/0601 |
| 2024/0249318 A1 | 7/2024 | Spiegel et al. | |
| 2024/0267344 A1 | 8/2024 | Mulligan et al. | |
| 2024/0291779 A1 | 8/2024 | Catalano et al. | |
| 2024/0296276 A1 | 9/2024 | Hattangady et al. | |
| 2024/0331211 A1* | 10/2024 | Davis | G06T 11/60 |
| 2024/0331251 A1* | 10/2024 | Santesteban Garay | |
| | | | G06T 13/40 |
| 2024/0354555 A1 | 10/2024 | Knipfing et al. | |
| 2024/0354641 A1 | 10/2024 | Miller et al. | |
| 2024/0355064 A1 | 10/2024 | Skrypnyk et al. | |
| 2024/0355065 A1 | 10/2024 | Miller et al. | |
| 2024/0355131 A1 | 10/2024 | Kuppersmith et al. | |
| 2024/0356871 A1 | 10/2024 | Brewer et al. | |
| 2024/0356873 A1 | 10/2024 | Brewer et al. | |
| 2024/0378763 A1* | 11/2024 | Assouline | G06N 3/08 |
| 2024/0404170 A1 | 12/2024 | Wong et al. | |
| 2025/0139895 A1 | 5/2025 | Hoffer et al. | |

FOREIGN PATENT DOCUMENTS

| | | |
|---|---|---|
| CN | 120642311 A | 9/2025 |
| CN | 120752659 A | 10/2025 |
| CN | 120752904 A | 10/2025 |
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2024158821 A1 | 8/2024 |
| WO | WO-2024167840 A1 | 8/2024 |
| WO | WO-2024178247 A1 | 8/2024 |
| WO | WO-2024220281 A1 | 10/2024 |
| WO | WO-2024220287 A1 | 10/2024 |
| WO | WO-2024220305 A1 | 10/2024 |
| WO | WO-2024220327 A1 | 10/2024 |
| WO | WO-2024220425 A1 | 10/2024 |
| WO | WO-2024220431 A1 | 10/2024 |
| WO | WO-2024220526 A1 | 10/2024 |

OTHER PUBLICATIONS

"U.S. Appl. No. 18/420,546, Final Office Action mailed Jun. 6, 2025", 14 pgs.

"U.S. Appl. No. 18/420,546, Non Final Office Action mailed Dec. 10, 2024", 12 pgs.

"U.S. Appl. No. 18/420,546, Response filed Mar. 10, 2025 to Non Final Office Action mailed Dec. 10, 2024", 10 pgs.

"U.S. Appl. No. 18/432,894, Examiner Interview Summary mailed Jun. 26, 2025", 2 pgs.

"U.S. Appl. No. 18/432,894, Non Final Office Action mailed Apr. 10, 2025", 11 pgs.

"U.S. Appl. No. 18/432,894, Response filed Jul. 10, 2025 to Non Final Office Action mailed Apr. 10, 2025", 9 pgs.

"U.S. Appl. No. 18/532,887, Non Final Office Action mailed Jul. 2, 2025", 18 pgs.

"U.S. Appl. No. 18/584,852, Non Final Office Action mailed Jun. 18, 2025", 23 pgs.

"U.S. Appl. No. 18/639,447, Non Final Office Action mailed Jun. 3, 2025", 18 pgs.

"Dslim/bert-base-NER", Hugging Face, [Online]. Retrieved from the Internet: <URL:https://web.archive.org/web/20230130180721/https://huggingface.co/dslim/bert-base-NER>, (archived Jan. 30, 2023), 7 pgs.

"FLAN-T5", Hugging Face, [Online]. Retrieved from the Internet: <URL: https://web.archive.org/web/20230208084940/https://huggingface.co/docs/transformers/model_doc/flan-t5>, (archived Feb. 8, 2023), 2 pgs.

"Google/flan-ul2", Hugging Face, [Online]. Retrieved from the Internet: <URL:https://web.archive.org/web/20230311131832/https://huggingface.co/google/flan-ul2>, (archived Mar. 11, 2023), 11 pgs.

"Hkunlp/instructor-large", Hugging Face, [Online]. Retrieved from the Internet: <URL:https://web.archive.org/web/20221221031926/https://huggingface.co/hkunlp/instructor-large>, (archived Dec. 21, 2022), 5 pgs.

"International Application Serial No. PCT/US2024/012626, International Search Report mailed Apr. 4, 2024", 4 pgs.

"International Application Serial No. PCT/US2024/012626, Written Opinion mailed Apr. 4, 2024", 5 pgs.

"International Application Serial No. PCT/US2024/014450, International Search Report mailed Jun. 3, 2024", 4 pgs.

"International Application Serial No. PCT/US2024/014450, Written Opinion mailed Jun. 3, 2024", 5 pgs.

"International Application Serial No. PCT/US2024/016940, International Search Report mailed May 24, 2024", 3 pgs.

"International Application Serial No. PCT/US2024/016940, Written Opinion mailed May 24, 2024", 9 pgs.

"International Application Serial No. PCT/US2024/023744, International Search Report mailed Aug. 22, 2024", 4 pgs.

"International Application Serial No. PCT/US2024/023744, Written Opinion mailed Aug. 22, 2024", 11 pgs.

"International Application Serial No. PCT/US2024/023877, International Search Report mailed Jul. 16, 2024", 5 pgs.

"International Application Serial No. PCT/US2024/023877, Written Opinion mailed Jul. 16, 2024", 6 pgs.

"International Application Serial No. PCT/US2024/024100, International Search Report mailed Jul. 18, 2024", 4 pgs.

"International Application Serial No. PCT/US2024/024100, Written Opinion mailed Jul. 18, 2024", 8 pgs.

"International Application Serial No. PCT/US2024/024459, International Search Report mailed Aug. 23, 2024", 5 pgs.

"International Application Serial No. PCT/US2024/024459, Written Opinion mailed Aug. 23, 2024", 7 pgs.

"International Application Serial No. PCT/US2024/024788, International Search Report mailed Jul. 16, 2024", 5 pgs.

"International Application Serial No. PCT/US2024/024788, Written

(56)        References Cited

OTHER PUBLICATIONS

Opinion mailed Jul. 16, 2024", 7 pgs.
"International Application Serial No. PCT/US2024/024798, International Search Report mailed Jul. 12, 2024", 3 pgs.
"International Application Serial No. PCT/US2024/024798, Written Opinion mailed Jul. 12, 2024", 5 pgs.
"International Application Serial No. PCT/US2024/024973, International Search Report mailed Sep. 3, 2024", 7 pgs.
"International Application Serial No. PCT/US2024/024973, Written Opinion mailed Sep. 3, 2024", 7 pgs.
Bastian, Matthias, et al., "ChatARKit: ChatGPT programs AR app using natural language alone", [Online]. Retrieved from the Internet: <https://mixed-news.com/en/chatarkit-chatgpt-programs-ar-appusing-natural-language-alone/>, (Dec. 31, 2022), 6 pgs.
Ivona, Tautkute, et al., "What Looks Good with my Sofa: Multimodal Search Engine for Interior Design", arxiv.org, Cornell University Library, 201 Olin Library Cornell University Ithaca, NY 14853, (Jul. 21, 2017), 8 pgs.
Jo, Unso Eun Seo, et al., "SetFit: Efficient Few-Shot Learning Without Prompts", Hugging Face, [Online]. Retrieved from the Internet: <URL: https://huggingface.co/blog/setfit>, (Sep. 26, 2022), 10 pgs.
Jun, Ehara, et al., "Texture overlay for virtual clothing based on PCA of silhouettes", Mixed and Augmented Reality, 2006. Ismar 2006. IEEE/ACM International Symposium on, IEEE, PI, (Oct. 22, 2006), 139-142.
Kawanishi, Katsuhiro, "How to Apply a Filter to Multiple Faces", [Online] Retrieved from the internet: <https://support.lensstudio.snapchat.com/hc/en-us/community/posts/4407620857236-How-to-apply-a-filter-to-multiple-faces>, (2021).
Liang, Yaoyuan, et al., "Multi-modal Contextual Graph Neural Network for Text Visual Question Answering", 2020 25th International Conference on Pattern Recognition (ICPR), IEEE, (Jan. 10, 2021), 8 pgs.
Nicholas, Renotte, "Real Time AI Face Landmark Detection in 20 Minutes with Tensorflow.JS and React", [Online] Retrieved from the internet: <https://www.youtube.com/watch?v=7IXYGDVHUNw>, (2020).
Sri Krishna, "Stable Diffusion creator Stability AI accelerates open-source AI, raises $101M", [Online] Retrieved from the internet: <https://venturebeat.com/ai/stable-diffusion-creator-stability-ai-raises-101m-funding-to-accelerate-open-source-ai/>, (Oct. 18, 2022).
Walton, Nick, "Our Shift to the Walls Approach", Latitude, [Online]. Retrieved from the Internet: <https://web.archive.org/web/20210930180047/https://latitude.io/blog/the-walls-approach>, (Sep. 30, 2021), 2 pgs.
Zaubar, "Zaubar Magic: AI-powered content creation tool for the metaverse by Zaubar", [Online]. Retrieved from the Internet: <https://www.youtube.com/watch?v=zpa30DWUyco>, (Apr. 6, 2023), 2 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12> (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.
"U.S. Appl. No. 18/420,546, Examiner Interview Summary mailed Jul. 21, 2025", 2 pgs.
"U.S. Appl. No. 18/420,546, Non Final Office Action mailed Oct. 1, 2025", 8 pgs.
"U.S. Appl. No. 18/420,546, Response filed Sep. 8, 2025 to Final Office Action mailed Jun. 6, 2025", 10 pgs.
"U.S. Appl. No. 18/432,894, Final Office Action mailed Oct. 22, 2025", 14 pgs.
"U.S. Appl. No. 18/497,629, Non Final Office Action mailed Sep. 10, 2025", 14 pgs.
"U.S. Appl. No. 18/532,887, Examiner Interview Summary mailed Oct. 1, 2025", 2 pgs.
"U.S. Appl. No. 18/532,887, Notice of Allowance mailed Oct. 28, 2025", 5 pgs.
"U.S. Appl. No. 18/532,887, Response filed Sep. 26, 2025 to Non Final Office Action mailed Jul. 2, 2025", 10 pgs.
"U.S. Appl. No. 18/584,852, Examiner Interview Summary mailed Jul. 23, 2025", 2 pgs.
"U.S. Appl. No. 18/584,852, Response filed Sep. 18, 2025 to Non Final Office Action mailed Jun. 18, 2025", 9 pgs.
"U.S. Appl. No. 18/639,447, Response filed Sep. 3, 2025 to Non Final Office Action mailed Jun. 3, 2025", 10 pgs.
"International Application Serial No. PCT/US2024/012626, International Preliminary Report on Patentability mailed Aug. 7, 2025", 7 pgs.
"International Application Serial No. PCT/US2024/014450, International Preliminary Report on Patentability mailed Aug. 21, 2025", 7 pgs.

(56) References Cited

OTHER PUBLICATIONS

"International Application Serial No. PCT/US2024/016940, International Preliminary Report on Patentability mailed Sep. 4, 2025", 11 pgs.

"International Application Serial No. PCT/US2024/023744, International Preliminary Report on Patentability mailed Oct. 30, 2025", 13 pgs.

"International Application Serial No. PCT/US2024/023877, International Preliminary Report on Patentability mailed Oct. 30, 2025", 8 pgs.

"International Application Serial No. PCT/US2024/024100, International Preliminary Report on Patentability mailed Oct. 30, 2025", 10 pgs.

"International Application Serial No. PCT/US2024/024459, International Preliminary Report on Patentability mailed Oct. 30, 2025", 9 pgs.

"International Application Serial No. PCT/US2024/024788, International Preliminary Report on Patentability mailed Oct. 30, 2025", 9 pgs.

"International Application Serial No. PCT/US2024/024798, International Preliminary Report on Patentability mailed Oct. 30, 2025", 7 pgs.

"International Application Serial No. PCT/US2024/024973, International Preliminary Report on Patentability mailed Oct. 30, 2025", 9 pgs.

Buckley, Sean, "Roblox launches its first generative AI game creation tools", engadget, [Online]. Retrieved from the Internet: <URL: https://www.engadget.com/roblox-launches-its-first-generative-ai-game-creation-tools-192043349.html>, (Mar. 21, 2023), 4 pgs.

* cited by examiner 104                              124                         100

Figure 2:
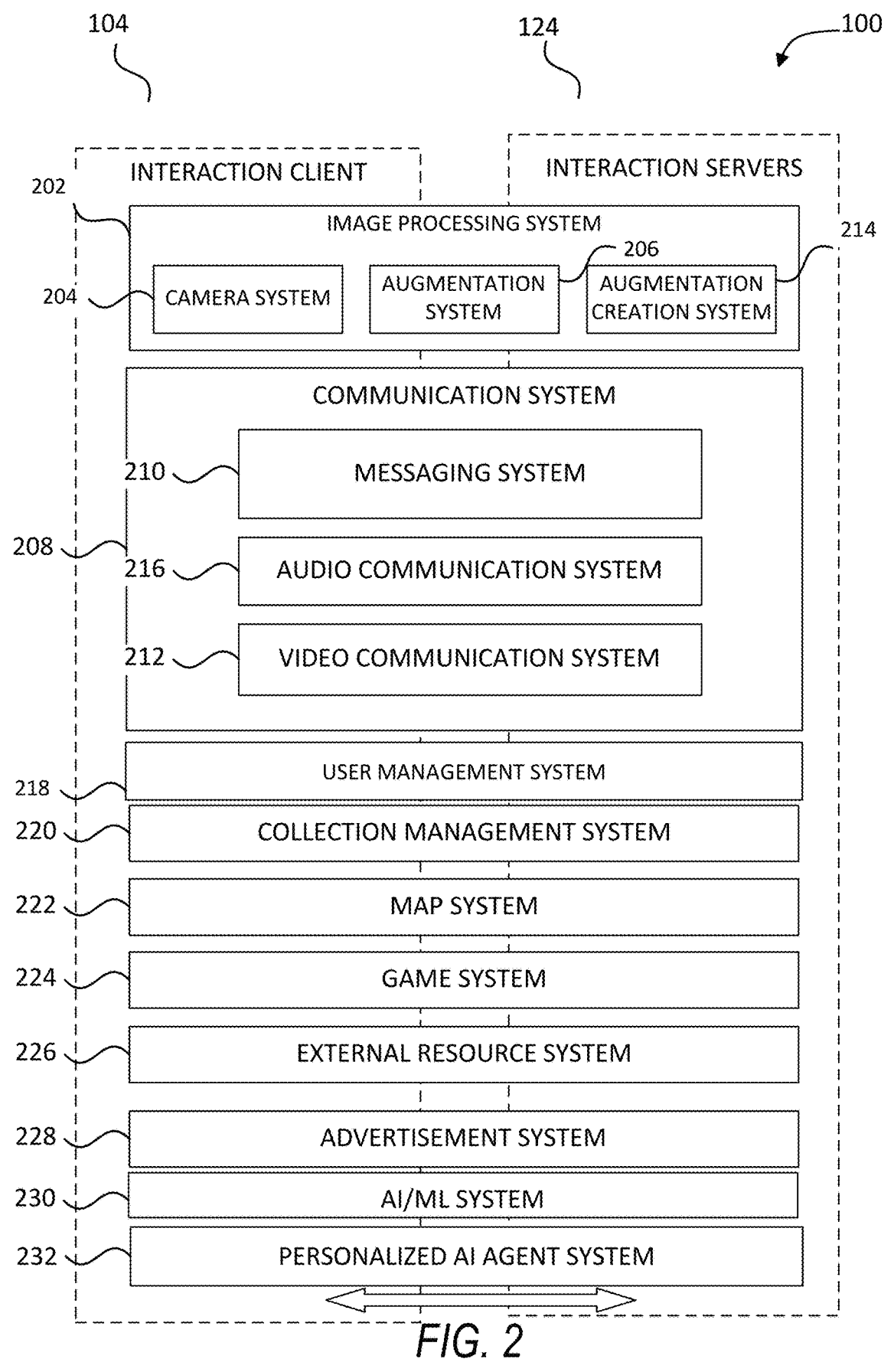

INTERACTION CLIENT          INTERACTION SERVERS

202

IMAGE PROCESSING SYSTEM                                    214

204 — CAMERA SYSTEM | AUGMENTATION SYSTEM | 206 AUGMENTATION CREATION SYSTEM

COMMUNICATION SYSTEM

208

210 — MESSAGING SYSTEM

216 — AUDIO COMMUNICATION SYSTEM

212 — VIDEO COMMUNICATION SYSTEM

218 — USER MANAGEMENT SYSTEM

220 — COLLECTION MANAGEMENT SYSTEM

222 — MAP SYSTEM

224 — GAME SYSTEM

226 — EXTERNAL RESOURCE SYSTEM

228 — ADVERTISEMENT SYSTEM

230 — AI/ML SYSTEM

232 — PERSONALIZED AI AGENT SYSTEM

PROFILE DATA

ENTITY GRAPH 310

312

MESSAGE TABLE 306

ENTITY TABLE 308

AUGMENTATION TABLE

ML TECHNIQUES 307

COLLECTIONS TABLE 318

VIDEO TABLE 314

IMAGE TABLE 316

DATABASE

800

710

720

810

820

For You

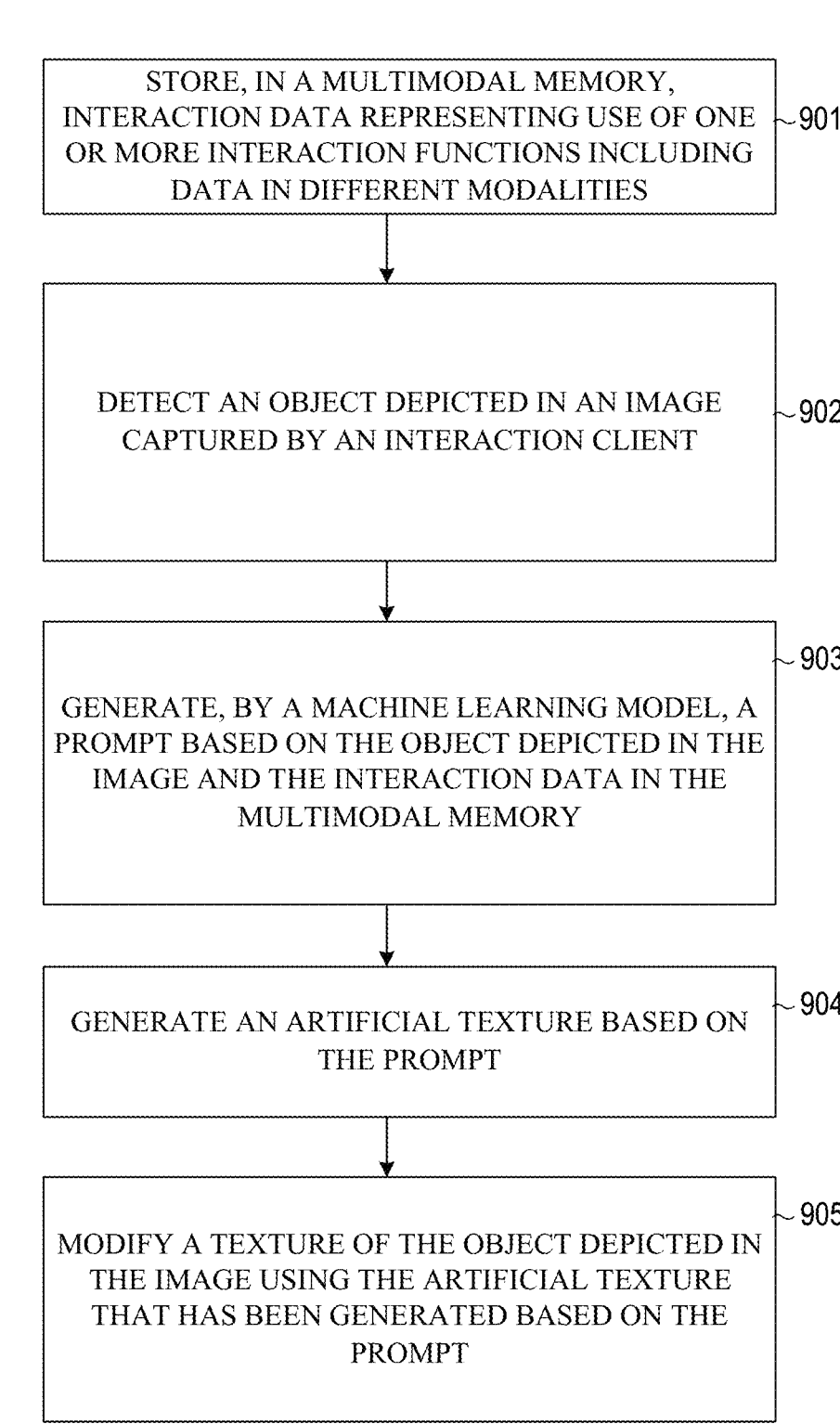

900

STORE, IN A MULTIMODAL MEMORY, INTERACTION DATA REPRESENTING USE OF ONE OR MORE INTERACTION FUNCTIONS INCLUDING DATA IN DIFFERENT MODALITIES — 901

DETECT AN OBJECT DEPICTED IN AN IMAGE CAPTURED BY AN INTERACTION CLIENT — 902

GENERATE, BY A MACHINE LEARNING MODEL, A PROMPT BASED ON THE OBJECT DEPICTED IN THE IMAGE AND THE INTERACTION DATA IN THE MULTIMODAL MEMORY — 903

GENERATE AN ARTIFICIAL TEXTURE BASED ON THE PROMPT — 904

MODIFY A TEXTURE OF THE OBJECT DEPICTED IN THE IMAGE USING THE ARTIFICIAL TEXTURE THAT HAS BEEN GENERATED BASED ON THE PROMPT — 905

FIG. 9

TEXTURE GENERATION USING MULTIMODAL EMBEDDINGS

CLAIM OF PRIORITY

This application claims the benefit of priority to U.S. Provisional Application Ser. No. 63/460,205, filed Apr. 18, 2023, which is incorporated herein by reference in its entirety.

TECHNICAL FIELD

The present disclosure relates generally to generating images using a multimodal memory.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like. In general, these systems are referred to as extended reality (XR) systems.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 2 is a diagrammatic representation of a messaging system that has both client-side and server-side functionality, according to some examples.

FIG. 9 is a flowchart illustrating example operations and methods of the texture generation system, in accordance with some examples.

DETAILED DESCRIPTION

Figure 1:
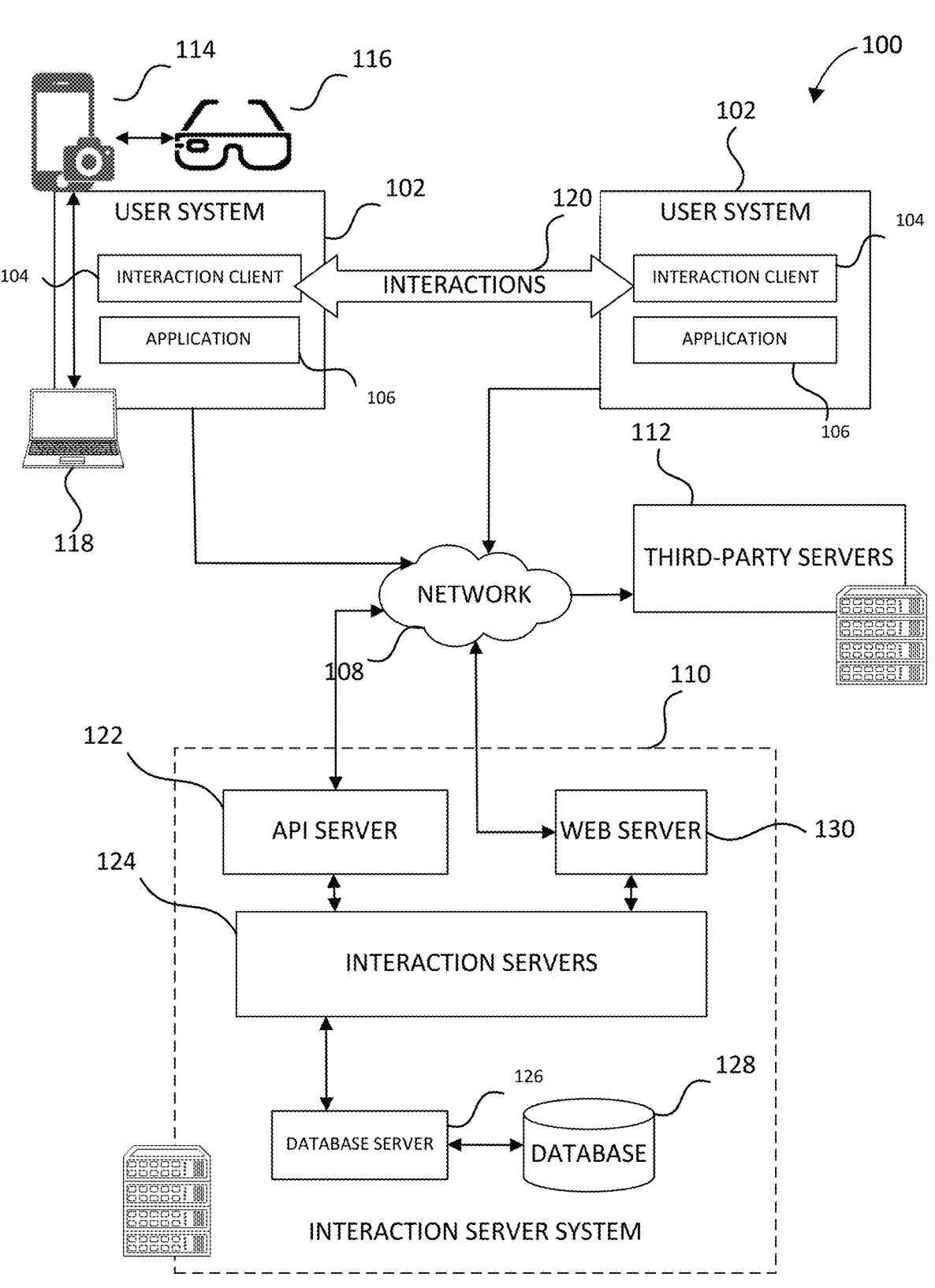
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, various communication platforms allow users to share content and create images for transmission to other users. These images can be used to promote products or services and/or to simply represent different real-world objects in simulated or real environments. However, these systems require a user to use expensive equipment and technology to create high-quality, appealing images. Also, users may spend a great deal of effort meticulously placing objects in different environments and manually adjusting lighting and other image attributes to enhance the presentation of the objects in the images. All of these factors can add up to make the creation of high-quality images (e.g., for use in advertising) a significant expense and detract from the overall use and enjoyment of the system. In addition, because users may not have the resources needed to create high-quality images, opportunities to share and present objects in ideal settings are missed. Also, presenting lower quality images of such objects can cause other users to overlook the value of the objects, which wastes the resources used to create and display the objects.

The disclosed techniques seek to improve the efficiency of using an electronic device by intelligently and automatically generating images that depict real-world objects in a real-world scene in a simple and intuitive manner. The disclosed techniques create photorealistic images or videos that depict a real-world object in simulated scenes very quickly and efficiently and with minimal user interaction or involvement. This can reduce the overall time and expense incurred to develop high-quality images that feature objects or products, such as shoes, shirts or other fashion items. In addition, the disclosed techniques leverage learned information about users to dynamically generate context-sensitive prompts for generating artificial textures and/or fashion items to modify an image and provide an AR experience to the user.

For example, the disclosed techniques store, in a multimodal memory, interaction data representing use of one or more interaction functions including data in different modalities. The disclosed techniques detect an object depicted in an image captured by an interaction client and generate, by a machine learning model, a prompt based on the object depicted in the image and the interaction data in the multimodal memory. The disclosed techniques generate an artificial texture based on the prompt and modify a texture of the object depicted in the image using the artificial texture that has been generated based on the prompt.

In this way, the disclosed techniques improve the overall experience of the user in using the electronic device and reduce the overall amount of resources needed to accomplish a task of producing high-quality images. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logo, AR emblem, pants, shorts, an outfit that includes a combination of multiple fashion items, jacket, t-shirt, blouse, glasses, jewelry, earrings, bunny ears, a hat, earmuffs, makeup, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client side by the interaction client 104 and on the server side by the interaction servers 124.

In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 (shown in FIG. 12) of a user system 102. These augmentations are selected by the augmentation system 206 and presented to a user of an interaction client 104, based on a number of inputs and data, such as, for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of a communication system 208, such as a messaging system 210 and a video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within a user management system 218) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
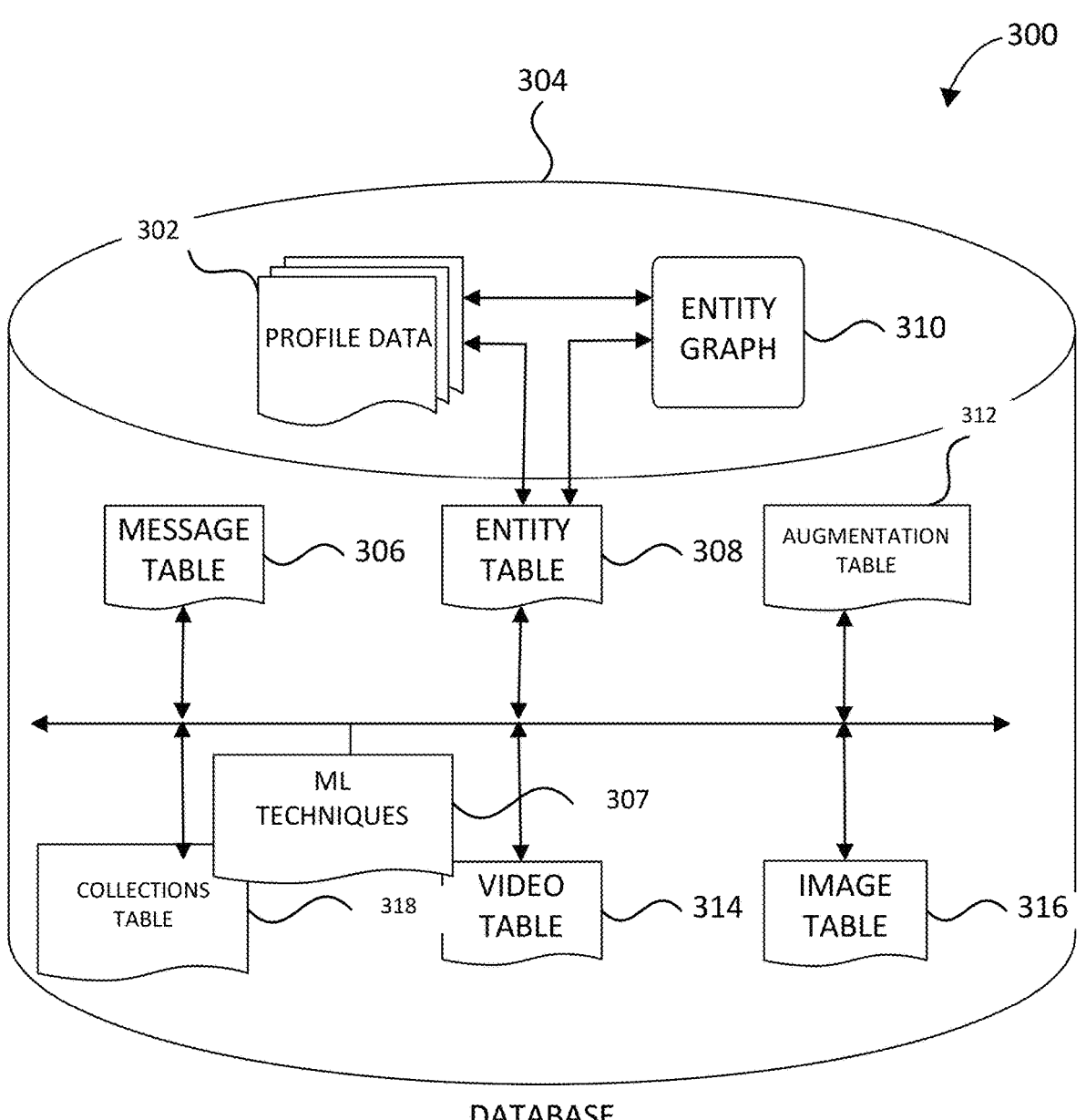
FIG. 3 is a diagrammatic representation of a data structure as maintained in a database, according to some examples.

A user management system 218 is operationally responsible for the management of user data and profiles, and maintains entity information (e.g., stored in entity tables 308, entity graphs 310, and profile data 302 of FIG. 3) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., 2D avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content, XR experiences, and AR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands. The artificial intelligence and machine learning system 230 may also provide personalized AI agent system 232 functionality to message interactions 120 between user systems 102 and between a user system 102 and the interaction server system 110.

In some cases, the artificial intelligence and machine learning system 230 can implement one or more machine learning models that generate artificial images of a person or object wearing an artificially generated fashion item corresponding to a textual description or prompt. The machine learning models can include verification models to verify or validate the artificial image and to generate a new image in which the artificially generated fashion item is replaced with an object or XR object that resembles (looks like) a real-world fashion item or product.

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting, may be used in various machine learning applications.

Generating a trained machine-learning program, such as artificial intelligence and machine learning system 230, may include multiple types of phases that form part of the machine-learning pipeline, including for example the following phases:

Data collection and preprocessing: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering: This may include selecting and transforming the training data to create features that are useful for predicting the target variable. Feature engineering may include (1) receiving features (e.g., as structured or labeled data in supervised learning) and/or (2) identifying features (e.g., unstructured or unlabeled data for unsupervised learning) in training data.

Model selection and training: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation: This may include evaluating the performance of a trained model (e.g., the trained machine-learning program) on a separate testing dataset. This can help determine if the model is overfitting or underfitting and if it is suitable for deployment.

Prediction: This involves using a trained model (e.g., trained machine-learning program) to generate predictions on new, unseen data.

Validation, refinement or retraining: This may include updating a model based on feedback generated from the prediction phase, such as new data or user feedback.

Deployment: This may include integrating the trained model (e.g., the trained machine-learning program) into a larger system or application, such as a web service, mobile app, or IoT device. This can involve setting up APIs, building a user interface, and ensuring that the model is scalable and can handle large volumes of data.

Prior to the training phase, feature engineering is used to identify features. This may include identifying informative, discriminating, and independent features for the effective operation of the trained machine-learning program in pattern recognition, classification, and regression. In some examples, the training data includes labeled data, which is known data for pre-identified features and one or more outcomes.

Each of the features may be a variable or attribute, such as individual measurable property of a process, article, system, or phenomenon represented by a data set (e.g., the training data). Features may also be of different types, such as numeric features, strings, vectors, matrices, encodings, and graphs, and may include the data obtained from the multimodal memory 508 (shown in FIG. 5). Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases, the machine-learning pipeline uses the training data to find correlations among the features that affect a predicted outcome or prediction/inference data. With the training data and the identified features, the trained machine-learning program is trained during the training phase during machine-learning program training. The machine-learning program training appraises values of the features as they correlate to the training data. The result of the training is the trained machine-learning program (e.g., a trained or learned model).

Further, the training phase may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a deep neural network that is able to perform both feature extraction and classification/clustering operations. The neural network includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network operationally computes a small function, such as an activation function, that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

The neural network can be iteratively trained by adjusting model parameters to minimize a specific loss function or maximize a certain objective. The system can continue to train the neural network by adjusting parameters based on the output of the validation, refinement, or retraining block, and rerun the prediction on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network even after deployment of the neural network. The neural network can be continuously trained as new data emerges, such as based on user creation or system-generated training data.

In some examples the trained machine-learning program, such as personalized AI agent system 232, may be a generative AI model. Generative AI is a term that may refer to any type of artificial intelligence that can create new content from training data. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data that is output include trend assessment and predictions, translations, summaries, image or video recognition and categorization, natural language processing, face recognition, user sentiment assessments, advertisement targeting and optimization, voice recognition, or media content generation, recommendation, and personalization.

A personalized AI agent system 232 provides personalized features to a user of an interaction client 104 by analyzing user data and behavior to understand their preferences and interests. By utilizing machine learning algorithms and data analytics, the personalized AI agent system 232 can learn and adapt to inferences of the user, and then generatively suggest content relevant, specific, and custom tailored to the user. The personalized AI agent system 232 can analyze data from multiple sources, such as various user systems 102, messages, profile information, external data sources, image data captured in real-time by a camera of the user system 102, and/or any combination thereof to generate content items in real time and provide such content items to the user.

The personalized AI agent system 232 tracks user activity, such as the posts the users like, share, or comment on, the topics the users follow, the people the users connect with, and the time the users spend on the platform. Tracking performed by the personalized AI agent system 232 is only enabled if the user opts into the experience of receiving real-time generated content. The personalized AI agent system 232 can present to the user a full list of all activity and information that will be tracked and used to generate real time content recommendations. Only after receiving confirmation from the user that the user approves having such activity and information tracked does the personalized AI agent system 232 begin collecting such data and using such data to provide and generate the real-time and on-the-fly content for presentation to the user.

The personalized AI agent system 232 can retrieve data from multiple data sources, such as activity on a user's mobile phone, an AR/VR device, a smart watch, a laptop, or other user device. Based on this information, the personalized AI agent system 232 can identify patterns and predict a user's interests to generate a multimodal memory for a particular user. The personalized AI agent system 232 analyzes the user's profile information, such as their age, gender, location, messages exchanged, and/or interactions performed on the user system 102 to provide personalized features. In some examples, the personalized AI agent system 232 suggests events and groups that are nearby, or recommends job opportunities that match the user's qualifications. The personalized AI agent system 232 can generate real-time AR experiences and/or message content that is/are relevant to current circumstances and/or a real-world environment perceived by the user.

Moreover, the personalized AI agent system 232 analyzes the content that the user creates and suggests the best time to post, the optimal hashtags to use, and the type of content that receives the most engagement. By doing so, the personalized AI agent system 232 helps the user increase their visibility and reach a wider audience. In this way, the personalized AI agent system 232 can assess data from different devices to provide personalized features through a variety of different devices. The personalized AI agent system 232 provides such personalized features automatically in real time based on the multimodal memory associated with the user and in the communication channel for the particular content that is preferred by the user. Analyzing user data and behavior to understand their preferences and interests, and then suggesting and generating content that are relevant to the users, not only enhances the user experience but also increases engagement and retention rates on the platform.

Data Architecture

FIG. 3 is a schematic diagram illustrating data structures 300, which may be stored in a database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), and a user-selected avatar representation (or collection of such avatar representations). A particular user may then selectively include one or more of these avatar representations within the content of messages communicated via the interaction system 100 and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying "lenses" or AR experiences). An AR content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning techniques 307 that stores parameters of one or more machine learning models that have been trained during training of the texture generation system 590. For example, trained machine learning techniques 307 stores the trained parameters of one or more artificial neural network machine learning models or techniques.

Data Communications Architecture

Figure 4:
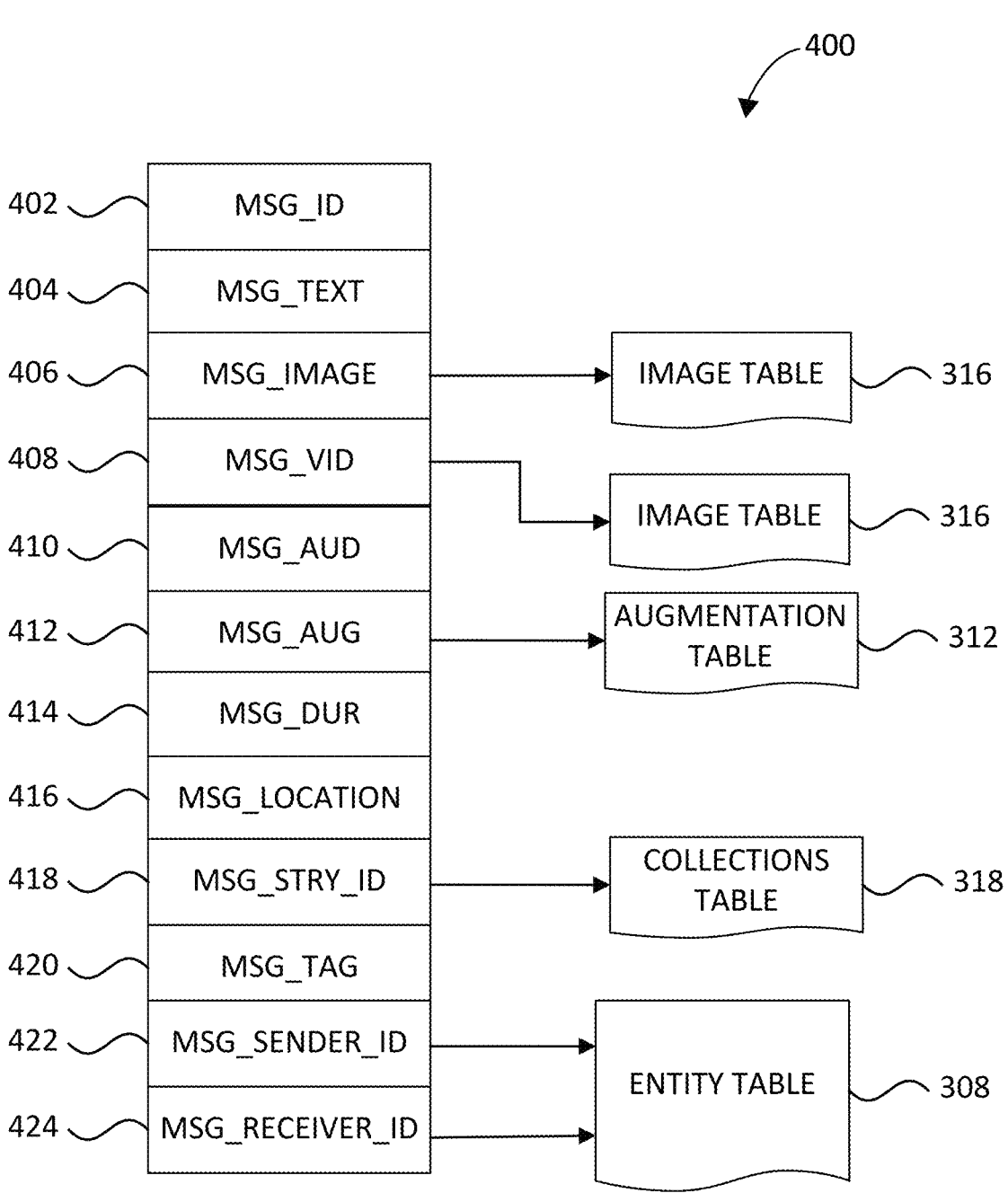
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Personal AI Agent System

Figure 5:
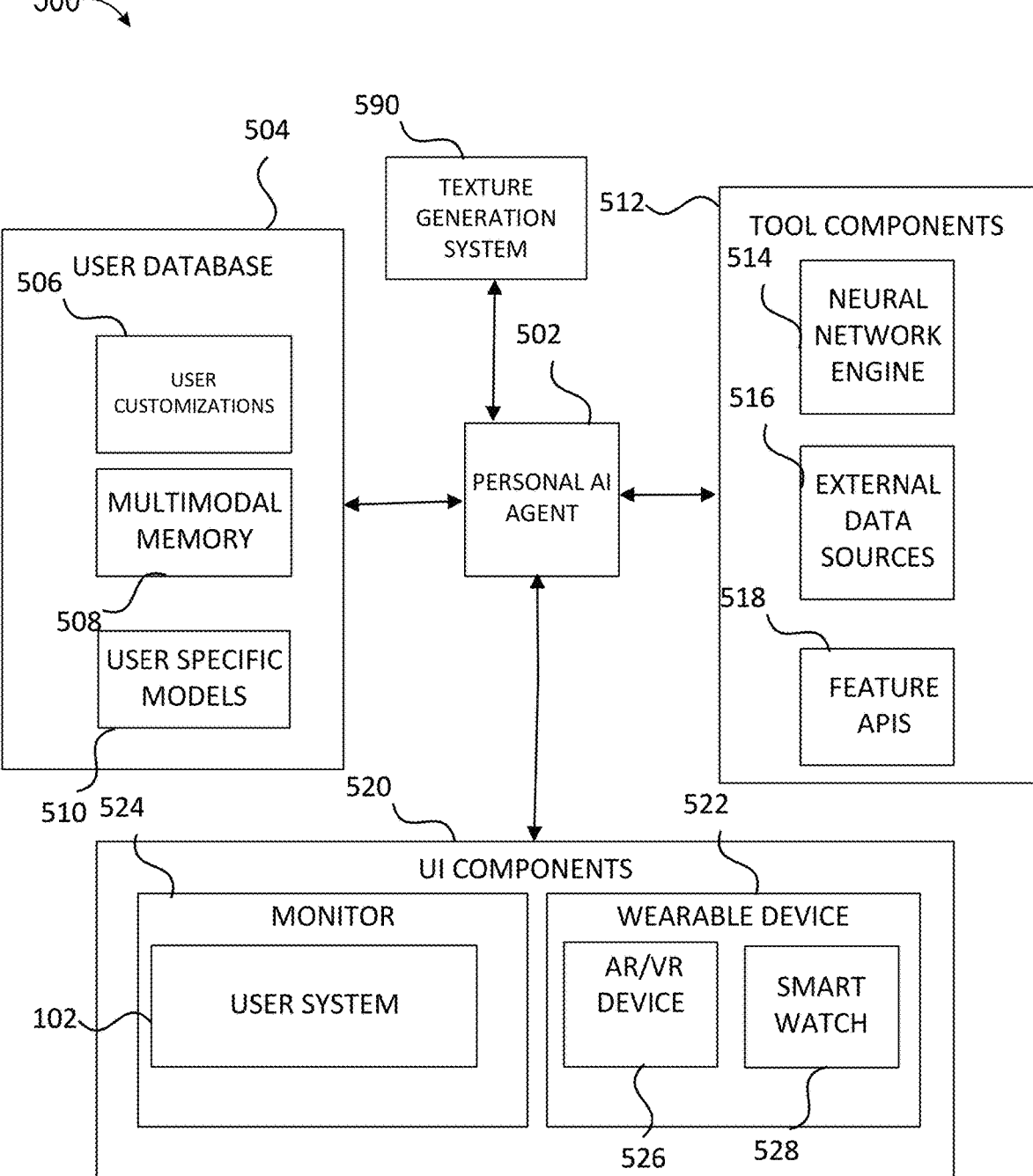
FIG. 5 illustrates an example architecture for applying a personalized personal AI agent to identify relevant features for a user, according to some examples.

FIG. 5 illustrates an example architecture 500 for applying a personal AI agent 502 to identify relevant features that are personalized for a user. The example architecture 500 can include a personal AI agent 502, a user database 504, tool components 512, a texture generation system 590, and UI components 520. The personal AI agent 502 implements one or more machine learning models that communicate with user database 504, UI components 520, and the tool components 512 to selectively and intelligently generate content to a user.

The user database 504 includes user customizations database 506, a multimodal memory 508, and user-specific models 510. In some cases, the personal AI agent 502 collects data from various sources and generates a multimodal memory 508 specific for a particular user. The personal AI agent 502 then provides personalized features to the user based on the identity model captured in the multimodal memory 508.

The multimodal memory 508 stores information pertinent to a user. Any of the data collected and stored in the multimodal memory 508 is collected and stored with express permission from the user on an opt-in basis. Non-limiting examples of multimodal memory types include:

Demographic data: information such as age, gender, location, income, education, and occupation.

Behavioral data: information about an individual's actions and interactions with a website, application, VR device, or other digital touchpoints. This data can include website visits, clicks, downloads, purchases, and user interaction with other users.

Psychographic data: information about an individual's personality.

Contextual data: information about the time, location, and device used by an individual when interacting with digital touchpoints. This data can help the personal AI agent 502 to understand the context of the interaction and personalize the experience accordingly.

Purchase history data: information about an individual's past purchases, such as products bought, frequency of purchases, and purchase amounts. This data can be used by the personal AI agent 502 to create personalized recommendations and offers. Data can also include advertisement interaction data that includes a user's interactions with advertisements such as clicks, impressions, and conversions.

Interests data: information about an individual's hobbies, interests, and passions, which can be collected through online posts and activities.

Communication data: information about how an individual prefers to be contacted and their communication history with other users. This data can be used to personalize communication channels and messaging (e.g., SMS message on phone or pop-up message on AR device).

Data from augmentation devices (such as AR/VR devices): information from a camera feed that the user uses to capture images or videos of the user's surroundings; selections of digital content items such as augmentations or overlays used on the camera feeds; biometric data such as heart rate, body temperature, facial expressions, and/or the like; the user's preferred interaction methods on the AR device; types/duration of AR interactions; eye tracing, eye focus, and gaze direction for where users are looking and for how long; body movements such as head or body motions, gestures, or interactions with the virtual environment; hand and finger movements using controllers or tracking devices; audio data from a microphone; user emotional responses such as heart rate, skin conductance, or facial expressions; user cognitive performance such as attention, memory, or problem-solving skills; and/or the like.

Contacts and connections data: data about a user's contacts and connections, including their friends, followers, and groups.

Device data: information about the user's device, including the type of device, operating system, and browser, which can be used to optimize the platform's performance and to provide a seamless experience across different devices.

The personal AI agent 502 links different aspects of a user profile into a multimodal memory 508. The multimodal memory 508 stores various aspects of a user (e.g., user's preferences, life styles, interest, friends) and can use this contextual information later on to create custom-tailored content. The value of such custom-tailored content increases over time and across other form factors as the personal AI agent 502 collects more data related to the user. With more and more digital touchpoints from the user as time progresses, the personal AI agent 502 gains a much deeper understanding of the user and can use historical context to find relevancy in any current user activity.

Multimodal memory 508 includes entity-based memory, which refers to memory that is focused on specific things, such as objects, people, places, events, and experiences. This aspect of multimodal memory 508 stores information about the attributes, features, and characteristics of these specific objects or people, such as remembering the name of a person, their appearance, their occupation, or their interests. Multimodal memory 508 also includes a knowledge graph memory, which refers to memory that is focused on how things are related or connected to each other. This aspect of the multimodal memory 508 organizes information in a structured way, where entities are linked together based on their relationships and attributes in a weighted manner. Knowledge graph memory helps the personal AI agent 502 understand the context and meaning of information by showing how different entities and concepts are related.

Each entity in the multimodal memory 508 can be linked to each other entity. The links between these entities can be weighted in different manners to represent how closely related the entities are to each other. For example, an entity representing a dog name can be linked to an entity for the user and to an entity representing animals, whereas another entity representing a human with the same name can be linked to the entity for the user and another entity representing contacts of the user. The entity representing the dog name can be linked with a greater weight to the entity for the animal than the link between the entity representing the human with the same name and the entity for the animal. Similarly, the entity representing the human with the same name as the dog can be linked with a greater weight to the entity for the contacts than the link between the entity representing the dog name and the entity for the human. In this way, a variety of information about a given user or individual or organization can be collected and related to establish links between the information.

In some cases, the entity-based memory is focused on specific things, while the knowledge graph memory is focused on how things are related. Entity-based memory stores information about individual entities, while knowledge graph memory organizes information based on the relationships and connections between entities. Both types of memory can be used to learn and understand the current context associated with one or more users. For example, the personal AI agent 502 can use the user database 504 to determine that a user posts a picture captured from a mobile phone with the user's dog and the caption or comments refer to the dog as Jake. The personal AI agent 502 can update the multimodal memory 508 for the user to store a link that associates the user with a dog named Jake, such as a link between an entity representing a dog and another entity representing the name Jake. Later on, the personal AI agent 502 can determine that the user is using a user system 102, such as an AR device, and the user can ask for the nearest hospital for Jake. The personal AI agent 502 accesses the multimodal memory 508 and determines that Jake is a dog based on the strength of the link between the name Jake and the entity for a dog. The personal AI agent 502 then recommends veterinary hospitals for the user.

The personal AI agent 502 uses embeddings for the multimodal memory 508, which refers to a technique used in machine learning to represent and store data from multiple modalities (such as images, text, and audio) in a common vector space. The purpose of embeddings is to capture the semantic meaning and relationships between different modalities, allowing for more efficient and accurate processing of multimodal data. In some examples, the personal AI agent 502 feeds the knowledge graph to an external or internal process to generate the latent embeddings. The personal AI agent 502 stores the latent embeddings in the multimodal memory 508 for use in generating the on-the-fly content recommendations and analysis. In some cases, the content recommendations are provided to the user system 102 without the user issuing a specific request for the content recommendations. For example, the user system 102 is used to capture or access an image, and the personal AI agent 502 detects the image being viewed by the user system 102. The personal AI agent 502 leverages the user database 504 to generate a specific AR experience and can automatically apply the generated AR experience on the image currently being accessed or viewed by the user system 102. In some cases, the personal AI agent 502 uses the tool components 512 (discussed below) to generate the unique AR experience and to provide and activate the AR experience on the user system 102.

The personal AI agent 502 uses these embeddings for cross-modal comparisons and analysis. In some examples, an embedding of an image is compared to the embedding of a corresponding text description to identify semantic relationships between the two. In the context of the multimodal memory 508, embeddings are used to store and retrieve information from different modalities in a more efficient and effective manner. In some examples, if a user has stored an entity (e.g., a memory object) that includes an image, text description, and audio recording, embeddings can be used to represent each of these modalities in a common vector space. This allows for the efficient retrieval and integration of information from multiple modalities when accessing the memory object.

The personal AI agent 502 generates embeddings using one or more techniques, such as neural networks. These embeddings can be fine-tuned and optimized for specific applications and tasks. The personal AI agent 502 creates embeddings for the multimodal memory that includes information about individuals and their relationships with other individuals, entities, and devices and the multimodal memory is generated using various data sources as described herein by identifying patterns and connections between entities. As such, the personal AI agent 502 can apply the multimodal memory for the user in a variety of different ways to provide personalized features for the user.

Users in the past may have selected certain customization options, such as content augmentations, graphics, or features within an application or AR device. The interaction system (e.g., the interaction system 100) stores such customizations of the user in a user customizations database 506. The personal AI agent 502 uses such customizations in providing relevant content, such as by identifying preferences of customizations of the user. In some examples, the user may have used a certain type of augmentation (e.g., adding pizza to camera feeds) or stickers that the user sends to friends.

The user customizations database 506 includes customizations made by the user within the interaction system. The user customizations database 506 stores profile customization (e.g., profile picture, cover photo, and introduction), news feed preferences (e.g., prioritizing certain friends, pages, and groups), and privacy settings (e.g., who can see posts, profile information, and activity). The user customizations database 506 stores personalized avatar and sticker selection, customized content augmentations and how these were applied to a camera feed, sound and music preferences for content creation, subscription preferences for channels and creators, and other types of user customizations based on the user's viewing history and engagement.

The user-specific models 510 include generative models for generating graphics, text, and images for the user. For example, the user-specific models 510 can generate stickers that include photographs, graphics, or animations. The user-specific models 510 generate avatars that represent users on the interaction system platform. Users can customize avatars to reflect the user's appearance, personality, and interests. The user-specific models 510 generate filters and content augmentations, such as augmented reality (AR) effects that can be applied in real-time, to enhance photos and videos. The user-specific models 510 generate memes to share humorous images, videos, and captions that convey a specific cultural idea or trend. The user-specific models 510 generate hashtags to categorize and organize user posts based on a particular theme or topic, which allow users to connect with other users who share similar interests or to participate in trending conversations. The user-specific models 510 generate short-lived photos and videos, which that can be viewed by their followers for a limited time, that include filters, stickers, and text overlays to make them more engaging.

The tool components 512 include one or more neural network engines 514, one or more external data sources 516, and one or more feature APIs 518. The neural network engine 514 includes one or more generative machine learning models. The generative machine learning models can be trained to generate a variety of different content. For example, the generative machine learning models are trained to receive a prompt as input (which can include any combination of text, images, audio, and/or videos) and to generate an output that responds to the prompt. In some cases, the generative machine learning models generate an artificial image/video and/or text that is responsive to the prompt. In some cases, the generative machine learning model generates content augmentations, such as filters that can overlay, modify, or augment a real-world camera feed with digital content items. In some cases, the personal AI agent 502 provides as input to the neural network engine 514 a prompt that is generated by the personal AI agent 502 based on information gathered from the UI components 520 (representing a current real-world environment) and user database 504. Namely, the personal AI agent 502 generates a prompt that includes an image captured by the user system 102 and one or more vectors derived from the multimodal memory 508. This prompt can be provided as input to the neural network engine 514. The neural network engine 514 then accesses additional sources of data, such as external data sources 516 and/or feature APIs 518, to generate content that matches the inputs of the prompt. In some examples, the personal AI agent 502 collects contextual data of a conversation, hears audio from the user, and/or receives some other input from the user or the user's environment and generates a request for the neural network engine 514.

The external data sources 516 can include various search engines, chat bots, email applications, calendar applications, messaging applications, social network applications, news sources, live media sources, and/or any combination thereof. The personal AI agent 502 accesses external data from external data sources 516 to generate and/or apply multimodal memory 508 for a user. In some examples, the personal AI agent 502 collects user data in different media types and creates embeddings for the user's multimodal memory 508. The personal AI agent 502 can retrieve data from external data sources 516 to apply to multimodal memory 508 and/or to use in generating the input for the neural network engine 514. The external data sources 516 can include any combination of a repository of scientific papers that include content information about the papers, title, author, abstract, keywords, and citations; data from emails, such as email addresses, contact lists, email content, attachments, and metadata (such as timestamps and IP addresses); search engine data, such as search queries, search history, location data, device information, and web activity; and/or communication data, such as messages, voice and video calls, roles in group messages, posts, comments, votes, user subscriptions, likes, followers, and hashtags.

The neural network engine 514 can intelligently select one or more of the external data sources 516 to populate data to respond to the prompt received from the personal AI agent 502. The feature APIs 518 can provide access to a variety of different additional tools, which may be proprietary. Using a given one of the APIs from the feature APIs 518, the neural network engine 514 can access additional machine learning tools to generate additional content. For example, one of the proprietary tools can include an AR experience generation tool. The neural network engine 514 can access the API of this tool to prompt the tool to generate an AR experience having specific features generated by the neural network engine 514 based on the prompt received from the personal AI agent 502. The neural network engine 514 can receive the specific AR experience and can further apply various effects and modifications to the AR experience in order to generate a response to the personal AI agent 502 that includes the AR experience matching the prompt. The personal AI agent 502 can then automatically augment and/or modify the image currently being presented on the user system 102 using the unique AR experience generated by the neural network engine 514. FIG. 5 shows one example of one of the many tool components 512 that can be accessed by the personal AI agent 502 to generate content. The components shown in FIG. 5 can be part of the neural network engine 514.

The personal AI agent 502 retrieves the personalized content for the user and applies the content through various feature APIs 518. The personal AI agent 502 applies the personalized and/or recommended content to interaction client features via the feature APIs 518 including a photo, video, or podcast that a user captures and shares with friends. The personal AI agent 502 recommends filters, stickers, text overlays, or content augmentation effects applied to a camera feed that can be then recorded and sent to individual users. The personal AI agent 502 applies the personalized and/or recommended content to interaction client features via the feature APIs 518 including messages, photos, and videos to individual friends or to groups; collection of photos or videos, such as a collection that can be viewed by friends for up to a certain time period (e.g., 24 hours); content from media partners, such as news articles, videos, and shows that are custom-curated for the user; map-related features, such as when and who to share locations with, how the system shares and what information is displayed on the map user interface; filters and/or XR experiences that include visual overlays applied to photos or video, such as adding location-based information, temperature, time, and other graphics; and customized avatars that can be used in photos/video, chat messages, and in other features.

In many cases, multiple input devices can be accessed by the personal AI agent 502 to generate the prompt for the neural network engine 514. These input devices or combination of input devices can include a wearable device 522 such as an AR/VR device 526, a device with a monitor 524 such as a user system 102, and/or a smart watch 528. The outputs generated by the personal AI agent 502 can be provided to any one of the same or different combinations of the AR/VR device 526, a user system 102, and/or a smart watch 528. The personal AI agent 502 identifies the preferred method of communication using the multimodal memory 508. In some examples, the personal AI agent 502 identifies that the user likes to be reminded via the smart watch 528, given directions on the AR/VR device 526, and receives text messages on the user's mobile phone.

The process for training the neural network engine 514 can be the same as previously discussed. The neural network engine 514 can receive a collection of training data that includes a variety of different prompts and ground truth responses. These ground truth responses can include identification of sources of data that can be used to respond to a prompt and/or generated image content or text content that responds to the prompt. The neural network engine 514 can iterate over the training data until a loss function satisfies a stopping criterion, where at each iteration, parameters of the neural network engine 514 are updated. In a similar manner, the personal AI agent 502 can be trained based on training data to generate a prompt to provide to the neural network engine 514. The training data can include a variety of latent vectors, images, and information obtained from the user database 504 and corresponding ground truth prompts. The personal AI agent 502 can iterate over the training data until a loss function satisfies a stopping criterion, where at each iteration parameters of the personal AI agent 502 are updated. In this way, the personal AI agent 502 can generate real-time prompts based on current information accessed or obtained by the UI components 520 to provide to the tool components 512 for generating content to provide back to the UI components 520.

In some examples, the personal AI agent 502 determines that the user is using the AR/VR device 526 and receives input via the AR/VR device 526 including a voice prompt specifying: "What can I cook with these ingredients?" The personal AI agent 502 accesses a camera feed on the AR/VR device 526 and identifies objects within the camera feed, which include potatoes and carrots. The personal AI agent 502 accesses multimodal memory 508 for the user and finds relevant user data from a common space vector, such as a like for a friend's potato and carrot soup, a user's location in Germany on a recent trip, and a video post from the user with context relating to authenticity of recipes. The personal AI agent 502 generates a prompt from this common space vector to input into a neural network engine 514, which asks for "authentic German soup recipes that include potato and carrots." The personal AI agent 502 accesses the multimodal memory 508 and identifies that the user prefers receiving recipe instructions via the AR/VR device 526, and, in response, proceeds to display recommended recipes received from the neural network engine 514 on the AR/VR device 526.

In some examples, the user is looking at a particular building with AR glasses. The personal AI agent 502 detects the user's location, accesses the multimodal memory 508, and determines from a common vector that the user has a dentist appointment in the building. The personal AI agent 502 displays a pop-up notification on the AR/VR device 526 regarding whether the user would like directions to the dentist office. In response to receiving a selection from the user for directions, the personal AI agent 502 overlays directions to the dentist office location on the AR/VR device 526.

The texture generation system 590 can continuously analyze images captured by one or more interaction client 104, such as the UI components 520. The texture generation system 590 can generate apply one or more machine learning models to detect a fashion item or object (e.g., real-world object) depicted in the images. In response to detecting the fashion item or object, the texture generation system 590 can generate a prompt for modifying a texture of the fashion item and/or object depicted in the image. In some cases, the prompt is generated based on speech input continuously captured and received by the interaction client 104. In some cases, the prompt is dynamically generated based on contextual cues gathered from the images and/or information objected from the multimodal memory 508.

The texture generation system 590 provides the prompt that includes a description of a target texture to the tool components 512. The tool components 512 can generate an artificial texture that corresponds to the description of the target texture. Once the texture generation system 590 receives the artificial texture from the tool components 512, the texture generation system 590 can generate a segmentation or retrieve a previously generated segmentation of the object and/or fashion item depicted in the image. The texture generation system 590 then modifies one or more attributes of the object and/or fashion item using the segmentation and the artificial texture, such as by replacing the fashion item with an artificial fashion item received from the tool components 512. The texture generation system 590 can be part of the personal AI agent 502 and perform similar functions as the personal AI agent 502.

Figure 6:
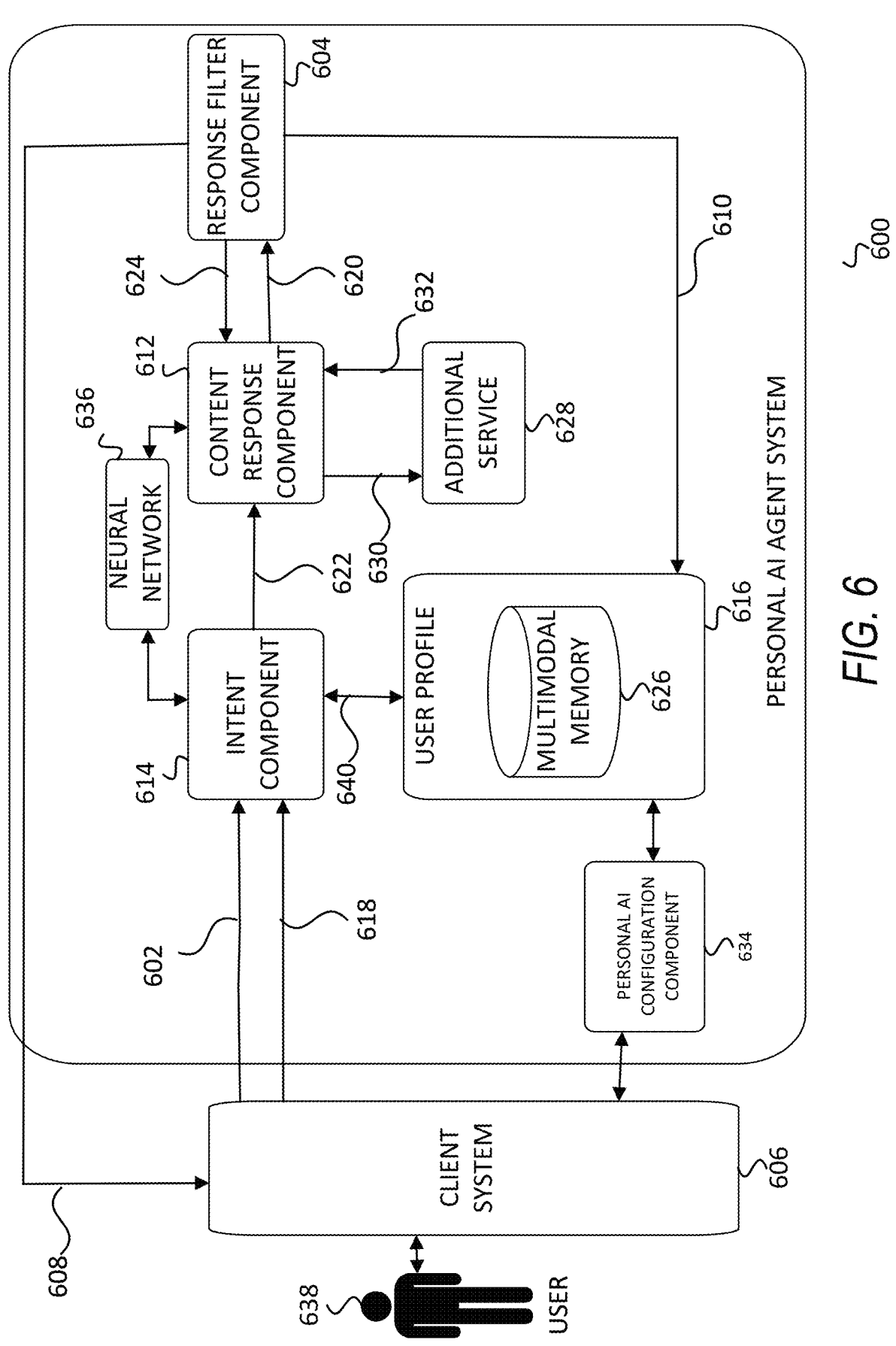
FIG. 6 is a block diagram of a personal AI system, according to some examples.

FIG. 6 is a block diagram of an example personal AI agent system 600, in accordance with some examples. The personal AI agent system 600 includes a client system 606, an intent component 614, a neural network 636, a content response component 612, a response filter component 604, an additional service 628, a user profile 616, and a personal AI configuration component 634. The user profile 616 can include some or all of the same components as user database 504. For example, the user profile 616 can include or provide access to a multimodal memory 626 which can include some or all of the components of multimodal memory 508. The client system 606 can include the same or similar components as user system 102.

In some examples, the personal AI agent system 600 is a software platform designed to simulate human decision-making through use of the multimodal memory 508. The personal AI agent system 600 may employ embeddings to generate the multimodal memory 626 in order to generate a user profile 616 and apply machine learning (ML)/artificial intelligence methodologies generate recommended content for the user.

In some examples, the personal AI agent architecture comprises one or more intent components 614, which can include the same features and functions as the content response component 612. The intent component 614 can be configured to understand an intent 622 of the user 638 and extract relevant information from the user input 602, responses to recommended content 618, or from collected data that is used to generate embeddings that can be stored in the multimodal memory 626. This can be achieved by analyzing user data to generate the multimodal memories 626 and mapping the user data to an intent 622 and/or receiving the intent 622 from the multimodal memories 626. The intent component 614 can use various methodologies such as rule-based systems, statistical models, Large Language Models (LLMs), neural networks, and the like to understand the intent 622 of the user 638.

The content response component 612 generates one or more content items 608 for presentation to the user 638. The content response component 612 uses the intent 622 received from the intent component 614 and any extracted information from the intent component 614 to determine the appropriate content item 610. This can be done using rule-based systems, decision trees, statistical models, LLMs, neural networks, and the like. In some examples, the intent component 614 and the content response component 612 are a single component, and in some other cases they are part of different devices/systems. The content response component 612 generates content items in a human-like manner by using methodologies such as, but not limited to, text generation and machine learning models. Content items can be in the form of directions, stickers, text, content augmentation, other features using feature APIs 518, and/or the like.

In some examples, either the intent component 614 and/or the content response component 612 may use a neural network 636 to improve their intent understanding and content management capabilities. For example, the intent component 614 uses the neural network 636 to analyze the user input 602 of the user 638 and the multimodal memory 626 for the user 638 and extract relevant information, such as the intent 622 of the user 638 and entities. If the response content is text, the content response component 612 uses the neural network 636 to identify and extract important information from unstructured text, such as a question of the user 638 or a request. This can be done using methodologies such as named entity recognition, part-of-speech tagging, sentiment analysis, and the like. The content response component 612 identifies other types of content that align with the intent 622 of the user 638, as further described herein.

In some examples, the intent component 614 communicates information 640 extracted or obtained from the multimodal memories 626 and/or the user input 602 and/or interaction directly to the neural network 636. The neural network 636 receives the extracted information and generates the one or more content items 610. In a similar manner, the content response component 612 may receive the intent 622 and generate a prompt based on the intent 622 that is communicated to the neural network 636. The neural network 636 receives the prompt and generates the one or more content items 610.

The personal AI agent system 600 receives, from a client system 606, user data that can be used to determine an intent of the user 638 during an interactive session. For example, the user 638 can use the client system 606 to access an interactive server that hosts the personal AI agent system 600. The user 638 interacts with a device, such as by entering a prompt as user input 602, into the client system 606, and the client system 606 communicates the user input 602 to the personal AI agent system 600. In some examples, the user input 602 may include other types of data as well as text such as, but not limited to, image data, video data, audio data, electronic documents, links to data stored on the Internet or the client system 606, and the like. In addition, the user input 602 may include media such as, but not limited to, audio media, image media, video media, textual media, and the like. Regardless of the data type of the user input 602, keyword attribution and expansion may be used to automatically generate a cluster of keywords or attributes that are associated with the received user input 602. For example, image recognition may be deployed in an automated manner to identify objects and location associated with visual media and image data and to generate a keyword cluster or cloud that is then associated with the image-based prompt.

The user input 602 or interaction may further be received through any number of interfaces and I/O components of the interaction client 104. These include gesture-based inputs obtained from a biometric component and inputs received via a Brain-Computer Interface (BCI). In some examples, the personal AI agent system 600 is integrated into various platforms such as, but not limited to, websites, messaging apps, and mobile apps, allowing users to interact with it through text or voice commands.

The personal AI agent system 600 determines the intent 622 of the user 638 using the information obtained from the multimodal memory 626 and the user input 602 and/or interaction. For example, the intent component 614 receives the information obtained from the multimodal memories 626 for the user 638, user input 602, and any user feedback including follow-up messages or interactions from the user 638, and uses an intent processing pipeline to determine the intent 622. This pipeline uses machine learning models, Natural Language Processing (NLP) methodologies, or other models or methodologies to map messages or interactions to intent (such as mapping sets of conversations to a bag of intentful keywords and concepts). In addition to the keywords that are used in the original user input 602, stemmed keywords and expanded concepts are also generated. The platform also assigns a weight to each concept based on the importance of those people in the conversation, of the interaction type and characteristics of the interactions and messages, and/or the like. These keywords, interaction types, and concepts are aggregated and mapped to the user 638 as part of an intent profile or intent vector having weighted keywords and concepts based on the importance of those in the conversation.

In some examples, the personal AI agent system 600 associates a time factor to a keyword, interaction, or concept where the time factor decays in time. For example, the personal AI agent system 600 attaches a time factor to the keywords, interactions, and concepts, which indicates how fresh that concept should be used for targeting and bidding. For example, "Hotels in Cancun for spring break" vs "Planning for wedding next year" will have two different decaying factors. In some examples, the personal AI agent system 600 applies a time factor to a conversation state.

In some examples, an overall intent of the user is built using various signals or data such as user demographics, location, device, engagement with organic surfaces such as a user interface and/or service features provided by the interactive device of an interactive platform application, consumption patterns, and overall friend-graph proximity carrier signals or data that may be discernable from the user's affiliation with the interactive platform.

In some examples, the intent vector is an additional dimension that can be used to refresh and update an intent profile stored in the user profile 616. In some examples, the personal AI agent system 600 uses the user profile 616 that includes multimodal memory 626 of the user 638 to determine an intent of the user 638. In some examples, the intent component 614 uses artificial intelligence methodologies including Machine Learning (ML) models to generate the intent 622. The personal AI agent system 600 uses the data on intent of the user 638 to generate one or more content items 608, and receive feedback to improve its responses and optimization capabilities over time by ingesting the feedback. The personal AI agent system 600 collects engagement of the user 638 on advertisements, organic surfaces (user interfaces and services provided to users by the interactive platform), features of the interactive platform system, and also responses to the personal AI agent system 600 itself and feeds that into the intent component 614. In this way, the personal AI agent system 600 can fine-tune or further pre-train the ML models of the intent component 614 to not only take an intent of the user 638 into consideration, but also use follow-up actions to fine-tune the intent of the user inference model.

In some examples, the personal AI agent system 600 collects a set of interactions (such as prompts or clicks) during an interactive session. The personal AI agent system 600 maps the set of interactions to an intent vector. The personal AI agent system 600 assigns weights to the characteristics of interactions based on an importance score to the conversation of the interactions, and determines the intent of the user based on the intent vector including the weighted characteristics of interactions. In some examples, the personal AI agent system 600 stores an interaction state in the user profile 616 as part of the multimodal memory 626 of a series of interactive sessions so that the personal AI agent system 600 can have a context for interactions that occur over a plurality of interactive sessions.

In some examples, a knowledge base of the personal AI agent system 600 includes a set of information that the personal AI agent can use to understand and respond to an input or interaction of the user 638. This includes, but is not limited to, a predefined set of intents, entities, and responses, as well as external sources of information such as databases or APIs. In some examples, intent information of a friend, or friends, of the user 638 are used to understand, inform, and/or respond to a user's intent.

The personal AI agent system 600 uses a content response component 612 to generate one or more content items 610 using the intent 622. For example, the content response component 612 receives the intent 622 and communicates the intent 622 as a neural network prompt to the neural network 636. The neural network 636 receives the neural network prompt and generates the content items 610. The neural network 636 communicates the content items 610 to the content response component 612. The content response component 612 receives the content items 610 and communicates the content items 610 to the response filter component 604 for additional processing. In some examples, the content response component 612 generates the content items 610 using a set of additional services 628, such as, but not limited to, an image generation or content augmentation system. The content response component 612 generates a service request 630 using the intent 622 and communicates the service request 630 to the additional services 628. The additional services 628 uses the service request 630 to generate the request response 632 and communicates the request response 632 to the content response component 612. The content response component 612 uses the request response 632 to generate the content items 610.

In some examples, the personal AI agent system 600 uses a response filter component 604 to filter a raw content response 620 generated by the content response component 612. For example, the content response component 612 communicates the raw content response 620 to the response filter component 604 and the response filter component 604 filters the raw content response 620 based on a set of filtering criteria to eliminate specified content from the raw content response 620, for instance obscene words, images, or concepts, or content that some may consider harmful. In some examples, the response filter component 604 generates an adjusted intent 622 based on filtering the raw content response 620, and the content response component 612 generates an additional raw content response 620 using the adjusted intent 622.

In some examples, the neural network 636 and the additional services 628 are hosted by the same system that hosts other components of the personal AI agent system 600. In some examples, the neural network 636 and the additional services 628 are hosted by a server system that is separate from the system that hosts the personal AI agent system 600, and the personal AI agent system 600 communicates with the neural network 636 and the additional services 628 over a network. For example, the personal AI agent system 600 receives the user input 602 and multimodal memories 626 and communicates the user input 602 and multimodal memories 626 to the neural network 636 residing on the separate server system. The neural network 636 receives the user input 602 and multimodal memories 626 and generates a raw content response 620. The neural network 636 then communicates the raw content response 620 to the personal AI agent system 600. The personal AI agent system 600 receives the response for subsequent processing as described herein.

In some examples, as part of the content items 610, the personal AI agent system 600 generates a set of interaction options that are displayed to the user 638 by the client system 606 that prompt the user 638 to interact with the personal AI agent system 600. The interaction options generated by the personal AI agent system 600 may include chat information such as, but not limited to, context sensitive material, instructions to the user 638, possible topics of conversation, interactive digital content items, and the like. In some examples, the personal AI agent system 600 uses the interaction options to suggest chat topics to a user 638 or to guide the user 638 through certain interaction steps that the user 638 can take, such as providing instructional material on various topics or digital content items that the user 638 can click through. In some examples, the interaction options comprise suggestions of conversations, questions, or interaction steps that are intended to solicit a user 638 to enter a prompt or make a particular interaction with the system 600. The interaction options are aimed at helping the user 638 get to information they need, but provide a helpful side effect of generating additional user interactions with the personal AI agent system 600. These additional user interactions improve the ability of the personal AI agent system 600 to determine user intent by providing additional context and information to the personal AI agent system 600.

In some examples, the personal AI agent system 600 determines a personality or tone for the responses or content generated by the personal AI agent system 600. For example, the personal AI agent system 600 stores a conversation or interaction state for the user 638 as part of the user's profile stored in the user profile 616. The personal AI agent system 600 uses the conversation or interaction state and demographic or other information about the user 638 to determine a personality or tone for the user 638, such as by adopting a formal tone for an older user, and a more informal tone for a younger user.

In some examples, the user 638 specifically alters the "persona" of interactions with the personal AI agent system 600 by interacting with a personal AI configuration component 634 and specifically requesting that the personal AI agent system 600 respond or act in a specific way (e.g., "be funnier", "answer in riddles" etc.) or provide certain type of content more often than others. In addition to modifying the personality or tone of the responses, the visual interface presented by the personal AI agent system 600 may also be altered to reflect a specific "persona" of the personal AI agent system 600. In some examples, a slide toggle may be presented to enable the user 638 to select between a menu of persona traits (e.g., "cheeky", "wry", "cute", etc.)

In some examples, the system that hosts the personal AI agent system 600 may not be a component of an interactive platform but another interaction system that provides services and information to a group of users such as, but not limited to, a platform that provides enterprise-wide connectivity to a group of users such as employees of a company, clients of an enterprise providing professional services, educational institutions, and the like. In some of such examples, the content provided to the users may not be advertising, but may be other types of useful information such as company policies, status messages for projects, newsworthy events, and the like.

In some examples, end-to-end encryption is used to secure communications thus ensuring that only the sender and the intended recipient can read the messages being exchanged. By implementing end-to-end encryption, the personal AI agent system 600 can provide a secure and private messaging experience for users while still extracting intent for advertising experience enhancement. In the context of intent of the user extraction, this means that once the conversation is end-to-end encrypted, the personal AI agent system 600 as an end of the conversation can decrypt messages and pass those to the intent extraction pipeline of the intent component 614. In some examples, the personal AI agent system 600 is operatively connected to an Internet search engine using the additional services 628 or the like, and a user can use the personal AI agent system 600 as an intelligent search engine to search the Internet. In some examples, the personal AI agent system 600 is operatively connected to a proprietary database via the additional services 628, and a user can use the personal AI agent system 600 as an intelligent search assistant for searching the proprietary database.

In some examples, machine learning components of the intent component 614, the content response component 612, and the neural network 636 are continuously retrained or fine-tuned based on user interactions with the content item 610. For example, interactions by a user with the content item 610 are stored in an analytics database (not shown).

Metrics of the interactions are then used to provide reinforcement to the content response component 612 when the content response component 612 provides a sequence of responses that lead to a successful intent 622 determination and consequently a properly targeted content item 610.

In some examples, the personal AI agent system 600 uses interactions between users and the generated content from other personal AI agents as inputs into the intent component 614 and/or the content response component 612. The other personal AI agents can be sponsored personal AI agents, custom personal AI agents built by users from self-serve tools/templates, and the like.

In some examples, the information that the personal AI agent system 600 extracts from conversations or interactions is focused on the intent of the user. In addition, the personal AI agent system 600 furthers a conversation or interaction with a user by knowing that intent of the user (e.g., if the user asks for good hotels in Cancun, the personal AI agent system 600 responds with: "Here is a list of hotels. I also know of a good promotion for a hotel, would you like to see it?" or provides a 5D model of various Cancun hotels on an AR device that are of a certain type of luxury that the user is accustomed to). This provides for the intent of the user being extracted from the user 638, matching the intent to other content, and embedding that content into the content items 610. In some examples, textual components of the additional content are used to fine tune the responses of the intent 622 determined by the intent component 614 and/or the content items 610 generated by the content response component 612. This improves the suggestions provided by the personal AI agent system 600 and improves user engagement.

In some examples, the personal AI agent system 600 can use an advertising content delivery and bidding component to provide advertisers an opportunity to bid on certain actions by choosing keywords or an expanded set of concepts (auto expansion) to select their potential target audience and display advertising content that will be delivered to users who match that criteria within their intent vector. Overall, by mapping conversations to a set of keywords, interactions, and concepts, and mapping those to user intent and profile, the advertising content delivery and bidding component of the personal AI agent system 600 enables advertisers to find their target audience much more precisely. In some examples, an AI-driven ad creative generation system of the personal AI agent system 600 assists advertisers by simplifying the process of creating advertising creatives and/or generating advertising creatives for the advertisers. By providing inputs such as website, target application, additional assets, and target keywords, the personal AI agent system 600 can automatically generate advertisement creatives. This can save advertisers time and resources, allowing them to focus on other aspects of their advertising campaigns.

The personal AI agent system 600 provides users with opt in/opt out options to opt out of the use of user information. The personal AI agent system 600 can operate by default as an opt-in system. Opt-in and opt-out options are mechanisms used by the system 600 to give users control over the use of their personal data. These options are especially significant in the era of data privacy regulations such as the General Data Protection Regulation (GDPR) and the California Consumer Privacy Act (CCPA). Below are some examples of opt-in mechanisms:

1) Opt-in: An opt-in approach requires users to actively give their consent before their personal data can be collected, processed, or shared by the application or website. This method is considered more privacyfriendly, as it ensures that users are fully aware of the data practices and intentionally choose to participate. Such opt-in options can appear as banners or pop-ups. These appear when users first visit a website or launch an application, requesting permission to collect and process personal data for specific purposes (e.g., targeted advertising, analytics, or personalization). Other opt-in options can be displayed in the form of checkboxes or toggle switches, allowing users to enable or disable data collection for specific purposes individually. In some examples, opt-in options are shown as in-context prompts, where users may encounter these when accessing particular features or functionalities within the application or website that rely on data collection (e.g., location-based services).

2) Opt-out: In an opt-out approach, the system assumes that users consent to data collection and processing by default. However, users are provided with options to withdraw their consent at any time. The system applies the opt-out approach in a limited number of circumstances.

The system provides privacy policy or settings, where users can access an application or website's privacy policy, which includes information about how to opt out of data collection and processing, or preference options that allow users to manage their privacy settings and disable specific data collection and sharing practices. To promote transparency and user control, the systems described herein clearly communicate data collection and processing practices, and provide easy-to-use opt-in and opt-out options.

Figure 7:
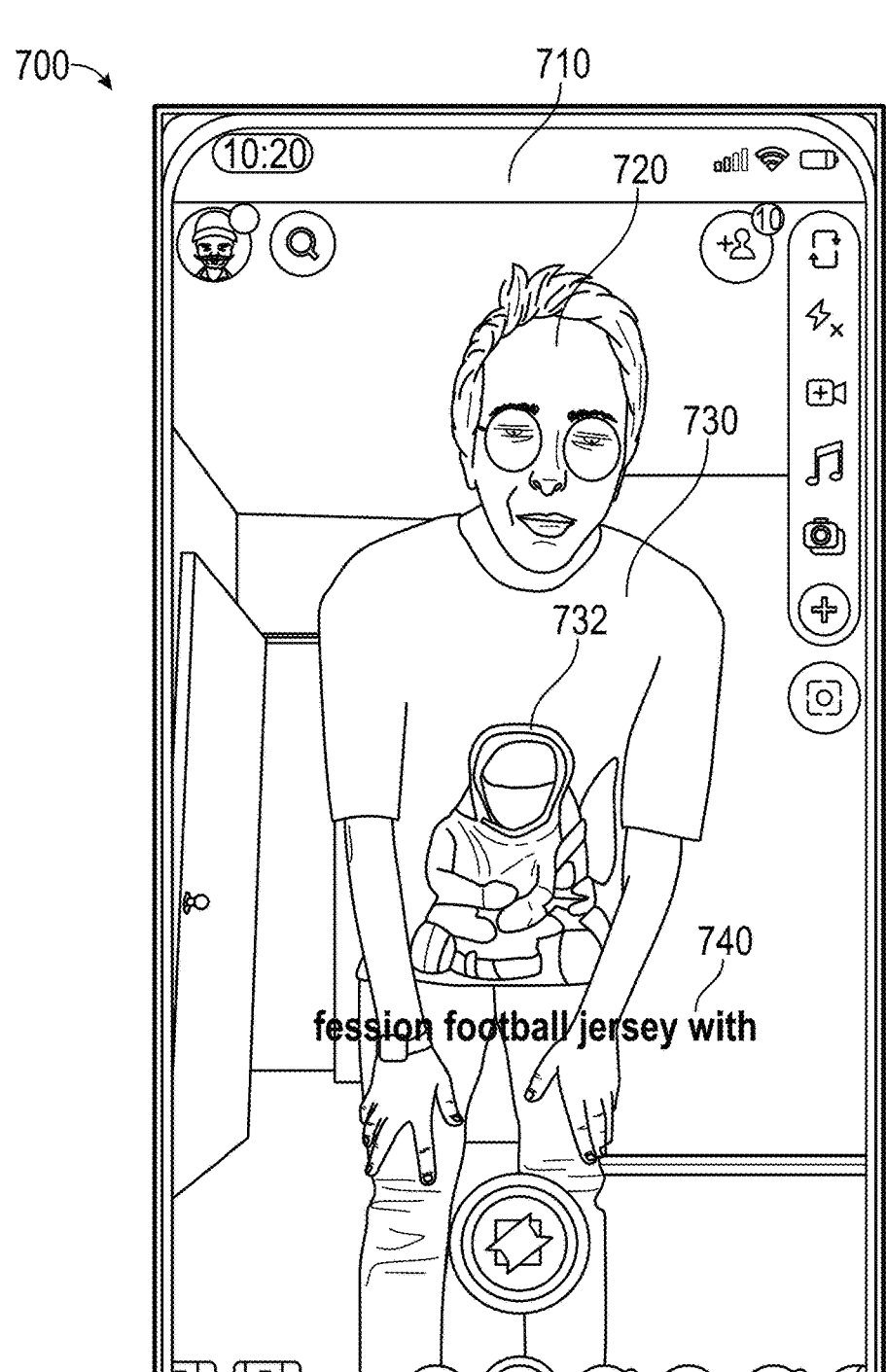
FIGS. 7-8 are diagrammatic representations of example inputs and outputs of the texture generation system, in accordance with some examples.

Referring back to FIG. 5, the texture generation system 590 can receive an input image, such as from a user, a person, a message, a communication, and/or from storage or an online database via the interaction client 104. The texture generation system 590 can, in some cases, activate a rear-facing or front-facing camera of the user system 102 automatically based on context clues obtained from the multimodal memory 508. The activated camera can capture an image or video that depicts a real-world object, such as a real-world person wearing a real-world fashion item within a certain real-world background. For example, as shown in the diagram 700 of FIG. 7, the texture generation system 590 receives an input image 710 from the user system 102. The input image 710 depicts a real-world object (e.g., person 720) wearing a real-world fashion item within a real-world scene or background.

In some examples, the texture generation system 590 receives input that includes or defines a prompt. In some examples, the texture generation system 590 dynamically generates the prompt using a machine learning model based on attributes of the image 710 and/or information obtained from the multimodal memory 508. For example, the texture generation system 590 can detect one or more objects in the image 710. The texture generation system 590 can apply the detected objects to the texture generation system 590 to retrieve entities, nodes and edges that connect the detected objects to other entities or nodes. Based on a strength of the connections using the nodes, the texture generation system 590 can select or retrieve one or more words, images, videos, graphics or content items that correspond to the nodes matching the objects detected in the image 710. The texture generation system 590 can add that retrieved information to a prompt.

In some cases, the texture generation system 590 can detect speech input from the interaction client 104. In response, the texture generation system 590 can convert the speech input to text and add one or more keywords from the speech input to the generated prompt. In some examples, the texture generation system 590 can detect an ambiguity in the speech input. For example, the texture generation system 590 can determine that the speech input includes a pronoun, such as "add my favorite team to this object." In this case, the ambiguity is what "this" object refers to. In order to resolve the ambiguity, the texture generation system 590 can access the multimodal memory 508. The texture generation system 590 can determine that, based on current information and past activity stored in the multimodal memory 508, the user typically likes to modify an upper garment, such as a shirt. In such circumstances, if both a real-world shirt and real-world pants are depicted in a captured image, the texture generation system 590 selects the real-world shirt as the object to which "this" in the speech input refers. The texture generation system 590 then adds to the prompt an identification of a shirt type of fashion item. The texture generation system 590 can also access the multimodal memory 508 to determine the favorite team of the user and add the indication of the favorite team to the prompt.

Each of these prompts (defined by the user or selected from a set of predefined prompts) includes a textual description of a target fashion item and, in some cases, a textual description of a background. The textual description of the fashion item can indicate a type of garment (e.g., coat, sweater, t-shirt, blouse, and so forth). The textual description can also optionally specify one or more attributes of the garment, such as a color, style, look, size, season, and so forth. In some examples, the textual description also includes a description of a background, such as specifying a location, weather, scenery, environment, and so forth. The texture generation system 590 provides the prompt to the tool components 512.

In some examples, the texture generation system 590 can access one or more fashion item templates. For example, a fashion item template can represent borders of a particular fashion item, such as a shirt, pants, and/or outfit or combination of multiple fashion items. The texture generation system 590 can select one of multiple fashion item templates based on keywords in the prompt, such as shirt, pants, shoes, and so forth. The fashion item template defines UV positions of regions of an input image that are targeted for artificial texture modification. The texture generation system 590 provides the selected fashion item template to the tools components 512 together with the prompt.

As an example, tool components 512 can generate an artificial texture and/or artificial fashion item corresponding to the received prompt. The tools components 512 can generate an artificial texture that matches the prompt and can populate the fashion item template using the artificial texture. The tools components 512 provides the populated fashion item template back to the texture generation system 590. The texture generation system 590 then overlays the populated fashion item template over the real-world object depicted in the received image. In some cases, the texture generation system 590 generates and/or accesses multiple fashion item templates. In such cases, the texture generation system 590 can provide at a first time a first fashion item template for the tools component 512 to populate with a first artificial texture. Then, the texture generation system 590 can provide at a second time (or together with the first fashion item template) a second fashion item template for the tools component 512 to populate with a second artificial texture. The texture generation system 590 can then overlay both the first and second populated templates on the object depicted in the image.

In some cases, the texture generation system 590 can apply a fashion item segmentation model to the image 710 to segment one or more fashion items depicted in the image 710. The texture generation system 590 can select a segmentation machine learning model that corresponds to the type of fashion item specified in the prompt. Namely, if the type of fashion item is an upper-body garment, such as a coat or shirt, the texture generation system 590 retrieves an upper-body garment segmentation model.

The upper-body garment segmentation model can be a specifically trained machine learning model that processes or analyzes input images and identifies upper-body garments in the images. The output of the upper-body garment segmentation model is a border that defines pixels in the image 710 that correspond to the upper-body fashion item. The segmentation can be applied to the image 710 to extract only those pixels that correspond to the upper-body fashion item. After extracting the pixels, the texture generation system 590 can use the segmentation to replace pixels of the real-world fashion item depicted in the image 710 with pixels of artificial texture and/or a fashion item received from the tool components 512. For example, as shown in the diagram 700, the texture generation system 590 can replace the shirt worn by the person 720 in the image 710 with the artificial texture and/or artificial fashion item 730 received from the tool components 512.

In some cases, the texture generation system 590 can generate a template for an upper-body fashion item based on the segmentation. The texture generation system 590 can send the generated template to the tool components 512 with a prompt representing the intent of the user (e.g., including one or more keywords received from the user) and can request that the tool components 512 generate an artificial texture for the generated template. The tool components 512 can populate the template for the upper-body fashion item and provide the populated template back to the texture generation system 590. The texture generation system 590 can then overlay the populated template on the real-world object depicted in the image.

In some examples, the texture generation system 590 receives a modification to the prompt based on additional user input, such as additional speech input. The texture generation system 590 can send the upper-body fashion item template with the modified prompt to the tool components 512. The tool components 512 can again generate an artificial texture and populate the upper-body fashion item template with the newly generated artificial texture. The texture generation system 590 can then receive the populated template and overlay that template on the real-world object. In this way, a user can, in real-time, make adjustments to a virtual object (e.g., an upper-body fashion item) by providing revisions to the prompt that was generated to cause the tool components 512 to update the artificial texture and to create an updated virtual fashion item.

As another example, if the type of fashion item (specified by one or more keywords from input received from the user or in the prompt) is a lower-body garment, such as a pants, the texture generation system 590 retrieves a lower-body garment segmentation model. The lower-body garment segmentation model can be a specifically trained machine learning model that processes or analyzes input images and identifies lower-body garments in the images. The output of the lower-body garment segmentation model is a border that defines pixels in the image 710 that correspond to the lower-body fashion item. The segmentation can be applied to the image 710 to extract only those pixels that correspond to the lower-body fashion item. After extracting the pixels, the texture generation system 590 can use the segmentation to replace pixels of the real-world fashion item depicted in the image 710 with pixels of artificial texture and/or a fashion item received from the tool components 512. For example, as shown in the diagram 700, the texture generation system 590 can replace the pants worn by the person 720 in the image 710 with the artificial texture and/or artificial fashion item 730 received from the tool components 512.

In some cases, the texture generation system 590 can generate a template for a lower-body fashion item based on the segmentation. The texture generation system 590 can send the generated template to the tool components 512 with a prompt representing the intent of the user (e.g., including one or more keywords received from the user) and can request that the tool components 512 generate an artificial texture for the generated template. The tool components 512 can populate the template for the lower-body fashion item and provide the populated template back to the texture generation system 590. The texture generation system 590 can then overlay the populated template on the real-world object depicted in the image.

In some examples, the texture generation system 590 receives a modification to the prompt based on additional user input, such as additional speech input. The texture generation system 590 can send the lower-body fashion item template with the modified prompt to the tool components 512. The tool components 512 can again generate an artificial texture and populate the lower-body fashion item template with the newly generated artificial texture. The texture generation system 590 can then receive the populated template and overlay that template on the real-world object. In this way, a user can, in real-time, make adjustments to a virtual object (e.g., an upper-body fashion item) by providing revisions to the prompt that was generated to cause the tool components 512 to update the artificial texture and to create an updated virtual fashion item.

In some cases, the texture generation system 590 first provides the upper-body template to the tool components 512 to have the tool components 512 populate the upper-body template with an artificial texture. Then, the texture generation system 590 provides the lower-body template to the tool components 512 to have the lower-body template populated with another artificial texture. The lower and upper body templates can also be provided together to the tool components 512. Any combination of templates can be provided to the tool components 512 with a prompt to populate the templates with artificial textures. These populated templates can then be applied to a real-world object depicted in an image.

The artificial fashion item 730 that has been overlaid on the person 720 based on the upper garment segmentation can include attributes that match data stored in the multimodal memory 508 and in the received prompt. As an example, the artificial fashion item 730 can include a logo 732 of the favorite team of the user of the interaction client 104 and can be in the style of a sports jersey associated with the sporting event in which the favorite team plays. In some cases, the texture generation system 590 can also generate an annotation 740 (e.g., textual annotation and/or graphic annotation) that includes some or all of the features of the prompt. In some cases, the annotation 740 includes certain portions of the speech input received from the user. The annotation 740 can be overlaid on a specified portion of the image 710 together with the artificial fashion item 730.

In some examples, the texture generation system 590 can present a buy option together with the overlaid artificial fashion item 730. In response to receiving input from a user selecting the buy option, the texture generation system 590 can complete a purchase transaction for a real-world product having a look and feel of the artificial fashion item 730.

In some cases, the texture generation system 590 analyzes the image 710 after modifying the texture of the real-world object depicted in the image 710. The texture generation system 590 can continue to monitor for inputs from the user of the interaction client 104. The texture generation system 590 can determine that additional speech input is received. The texture generation system 590 can generate a new prompt that includes a modification to the artificial fashion item 730 based on the additional speech input. For example, the additional speech input can include the phrase "change to blue." The texture generation system 590 can determine, based on the multimodal memory 508 and the image 710, that the input refers to the artificial fashion item 730. In response, the texture generation system 590 can generate a new prompt that includes the image 710 and a request to modify the texture of the artificial fashion item 730 to match the received input. For example, the new prompt can specify a different style, color, characteristic, and/or logo for the artificial fashion item 730. In some cases, the speech input can specify a logo, such as a team logo or name of a friend. In such cases, the texture generation system 590 can add to the new prompt an identification of the team logo or name of the friend. The speech input can specify a location in which to place or perform the modification, such as "only on the right sleeve." The texture generation system 590 can modify the new prompt to indicate the specified location of the artificial fashion item 730.

Figure 8:
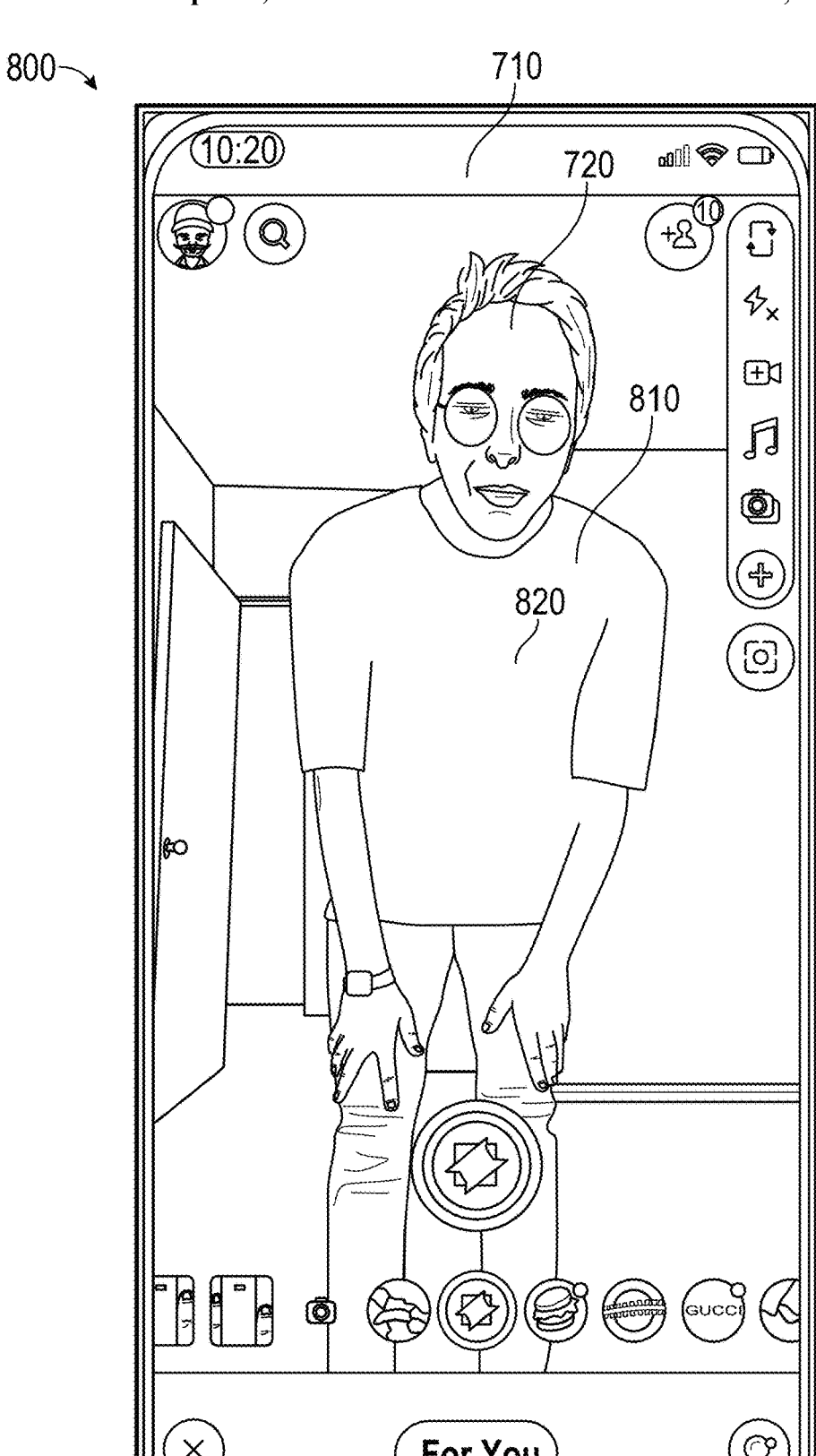

The texture generation system 590 provides the new prompt to the tool components 512. The tool components 512 regenerates a new artificial fashion item or texture and provides the regenerated artificial fashion item or texture to the texture generation system 590. The texture generation system 590 then modifies the image 710 again by replacing the artificial fashion item 730 with a new fashion item 810, as shown in FIG. 8. The new fashion item 810 can include one or more visual features 820 that match the speech input received from the interaction client 104. For example, the new fashion item 810 can differ in color, style, logo, and/or positioning of graphical elements from the artificial fashion item 730.

FIG. 9 is a flowchart of a process or method 900 performed by the texture generation system 590, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the texture generation system 590 (e.g., a user system 102 or a server) stores, in a multimodal memory, interaction data representing use of one or more interaction functions including data in different modalities, as discussed above.

At operation 902, the texture generation system 590 detects an object depicted in an image captured by an interaction client, as discussed above.

At operation 903, the texture generation system 590 generates, by a machine learning model, a prompt based on the object depicted in the image and the interaction data in the multimodal memory, as discussed above.

At operation 904, the texture generation system 590 generates an artificial texture based on the prompt, as discussed above.

At operation 905, the texture generation system 590 modifies a texture of the object depicted in the image using the artificial texture that has been generated based on the prompt, as discussed above.

EXAMPLES

Example 1. A method comprising: storing, in a multimodal memory, interaction data representing use of one or more interaction functions including data in different modalities; detecting an object depicted in an image captured by an interaction client; generating, by a machine learning model, a prompt based on the object depicted in the image and the interaction data in the multimodal memory; generating an artificial texture based on the prompt; and modifying a texture of the object depicted in the image using the artificial texture that has been generated based on the prompt.

Example 2. The method of Example 1, wherein the prompt comprises a textual description of a fashion item worn by the object depicted in the image.

Example 3. The method of any one of Examples 1-2, further comprising: processing the prompt using a generative machine learning model to generate the artificial texture.

Example 4. The method of any one of Examples 1-3, further comprising: receiving input from the interaction client that specifies one or more parameters of the prompt.

Example 5. The method of any one of Examples 1-4, further comprising: processing the image to generate a segmentation of a fashion item worn by the object depicted in the image.

Example 6. The method of Example 5, wherein the fashion item worn by the object is replaced with the artificial texture based on the segmentation of the fashion item.

Example 7. The method of any one of Examples 1-6, further comprising: continuously monitoring speech input received from a user of the interaction client; and generating the prompt in response to detecting one or more keywords in the speech input.

Example 8. The method of Example 7, wherein the one or more keywords correspond to a fashion item depicted in the image and one or more attributes.

Example 9. The method of Example 8, wherein the one or more attributes comprise a fashion item style, further comprising: adding to the prompt an identification of the fashion item and a target style corresponding to the fashion item style, wherein the artificial texture comprises an artificial fashion item in the target style.

Example 10. The method of Example 9, further comprising: identifying one or more preferences of the user based on the interaction data stored in the multimodal memory; adding to the prompt an indication of the one or more preferences, wherein the artificial texture comprises a representation of the one or more preferences.

Example 11. The method of Example 10, wherein the one or more preferences correspond to a sporting event associated with the user, wherein the fashion item style corresponds to a jersey associated with the sporting event, and wherein the one or more preferences comprise a team associated with the user, the representation comprises a logo of the team.

Example 12. The method of any one of Examples 1-11, further comprising: generating, by the machine learning model, an annotation representing the prompt; and overlaying the annotation on the image that comprises the object with the modified texture.

Example 13. The method of any one of Examples 1-12, further comprising: detecting ambiguity in speech input received from a user of the interaction client; and resolving the ambiguity based on the multimodal memory, wherein the prompt is generated in response to resolving the ambiguity in the speech input.

Example 14: The method of any one of Examples 1-13, further comprising: accessing a fashion item template based on the prompt; providing the fashion item template to the machine learning model to populate the fashion item template with the artificial texture; and overlaying the fashion item template populated with the artificial texture on the object depicted in the image.

Example 15: The method of Example 14, wherein the fashion item template is generated using a segmentation machine learning model that is applied to the object depicted in the image.

Example 16: The method of Example 15: wherein the segmentation machine learning model is selected from a plurality of segmentation machine learning models based on keywords in the prompt.

Example 17: The method of any one of Examples 14-16, wherein the fashion item template comprises a combination of multiple fashion item templates for different parts of a body, further comprising providing an option for a user to purchase a real-world fashion item corresponding to the fashion item template populated with the artificial texture.

Example 18: The method of Example 17, further comprising: providing a first of the multiple fashion item templates to the machine learning model to populate the first fashion item template with a first artificial texture; providing a second of the multiple fashion item templates to the machine learning model to populate the second fashion item template with a second artificial texture; and overlaying the first and second fashion item templates populated with the first and second artificial textures on the object depicted in the image.

Example 19. A system comprising: at least one processor; and at least one memory component having instructions stored thereon that, when executed by the at least one processor, cause the at least one processor to perform operations comprising: storing, in a multimodal memory, interaction data representing use of one or more interaction functions including data in different modalities; detecting an object depicted in an image captured by an interaction client; generating, by a machine learning model, a prompt based on the object depicted in the image and the interaction data in the multimodal memory; generating an artificial texture based on the prompt; and modifying a texture of the object depicted in the image using the artificial texture that has been generated based on the prompt.

Example 20. A non-transitory computer-readable storage medium having stored thereon instructions that, when executed by at least one processor, cause the at least one processor to perform operations comprising: storing, in a multimodal memory, interaction data representing use of one or more interaction functions including data in different modalities; detecting an object depicted in an image captured by an interaction client; generating, by a machine learning model, a prompt based on the object depicted in the image and the interaction data in the multimodal memory; generating an artificial texture based on the prompt; and modifying a texture of the object depicted in the image using the artificial texture that has been generated based on the prompt.

Machine Architecture

Figure 10:
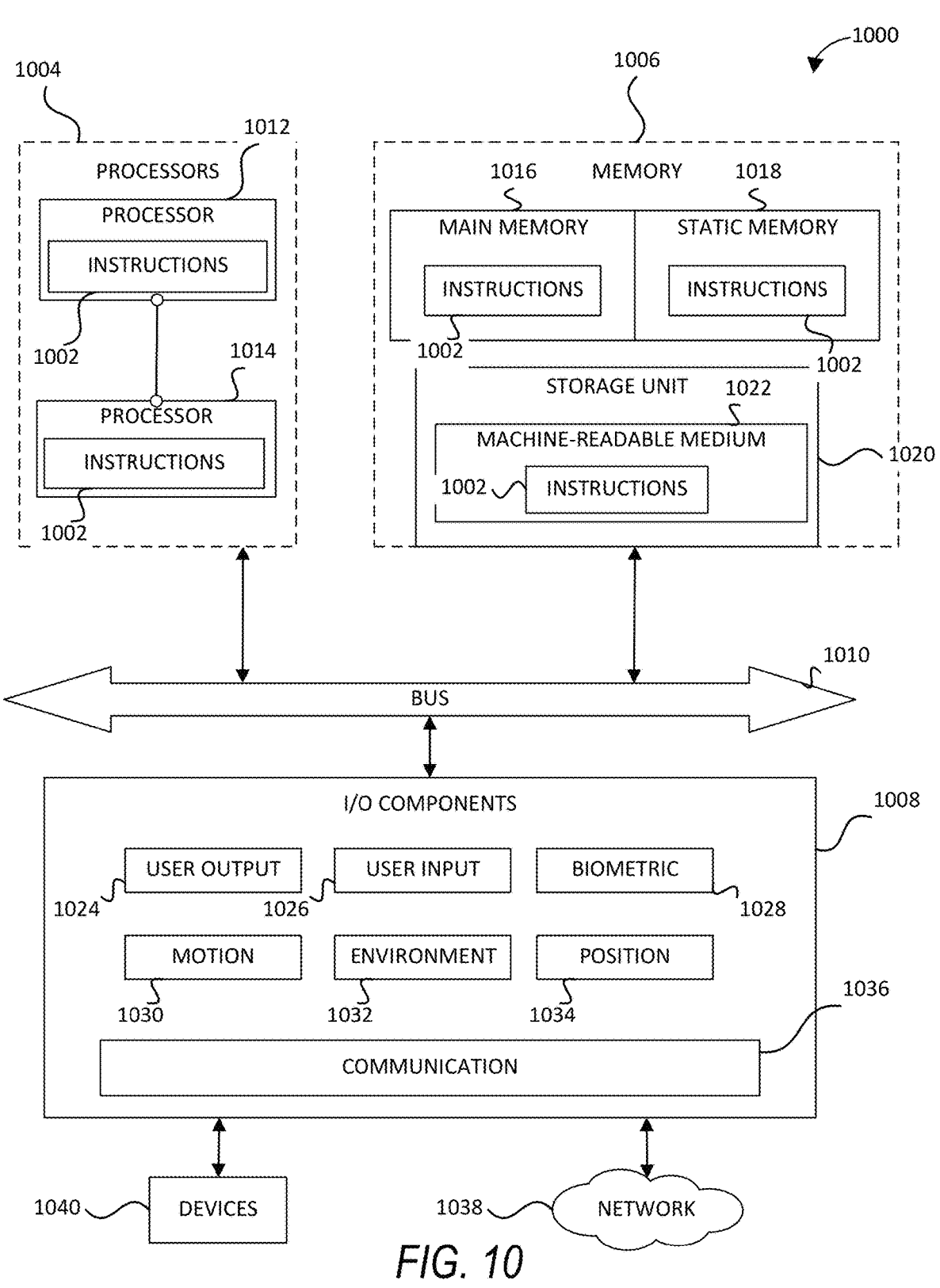
FIG. 10 is a diagrammatic representation of a machine in the form of a computer system within which a set of instructions may be executed to cause the machine to perform any one or more of the methodologies discussed herein, in accordance with some examples.

FIG. 10 is a diagrammatic representation of a machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output (I/O) components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, all accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad, or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 1040 may be another machine or any of a wide variety of peripheral devices (e.g., a peripheral device coupled via a universal serial bus (USB)).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data-glyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., HTTP). Similarly, the instructions 1002 may be transmitted or received using a transmission medium via a coupling (e.g., a peer-to-peer coupling) to the devices 1040.

Software Architecture

Figure 11:
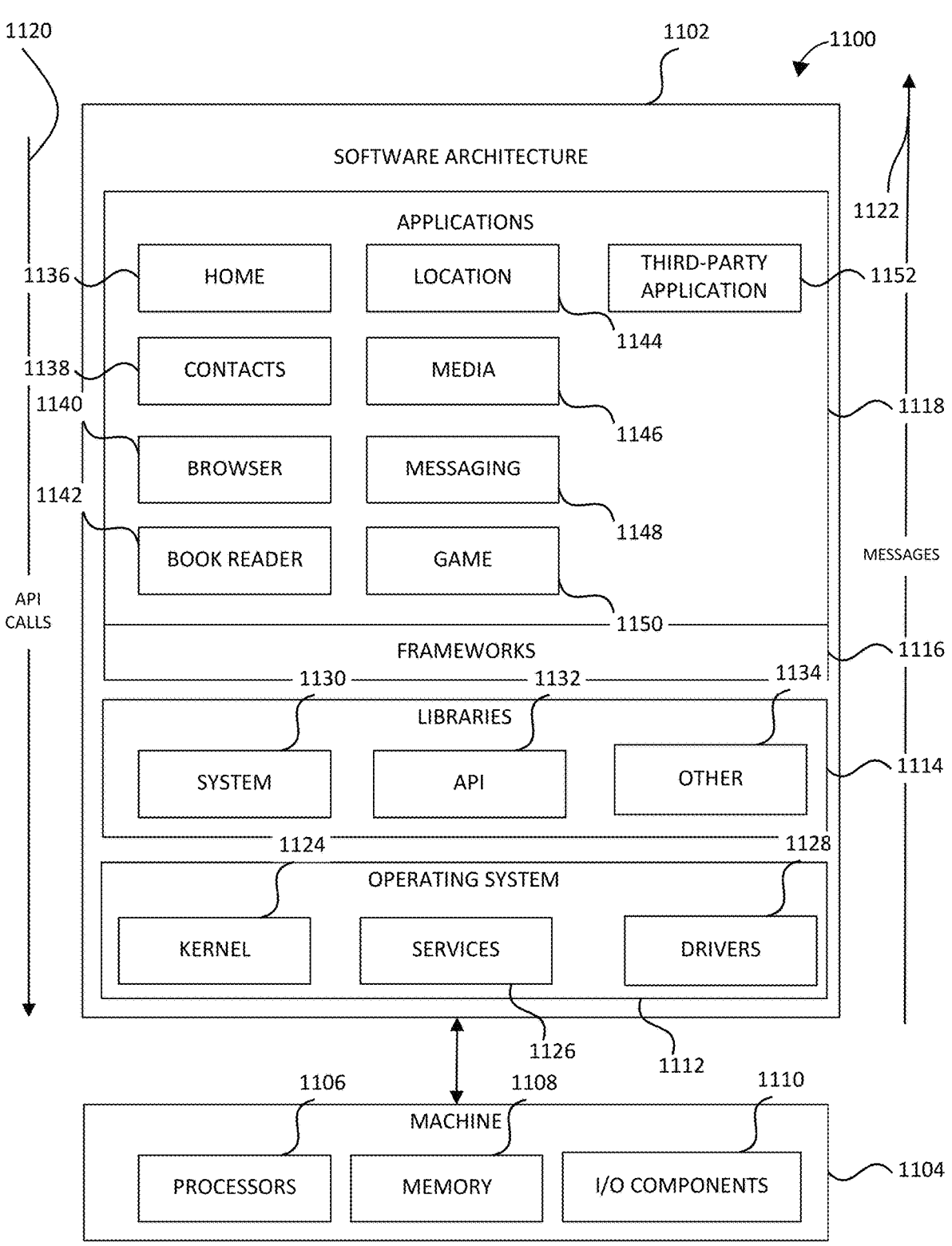
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various GUI functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

System with Head-Wearable Apparatus

Figure 12:
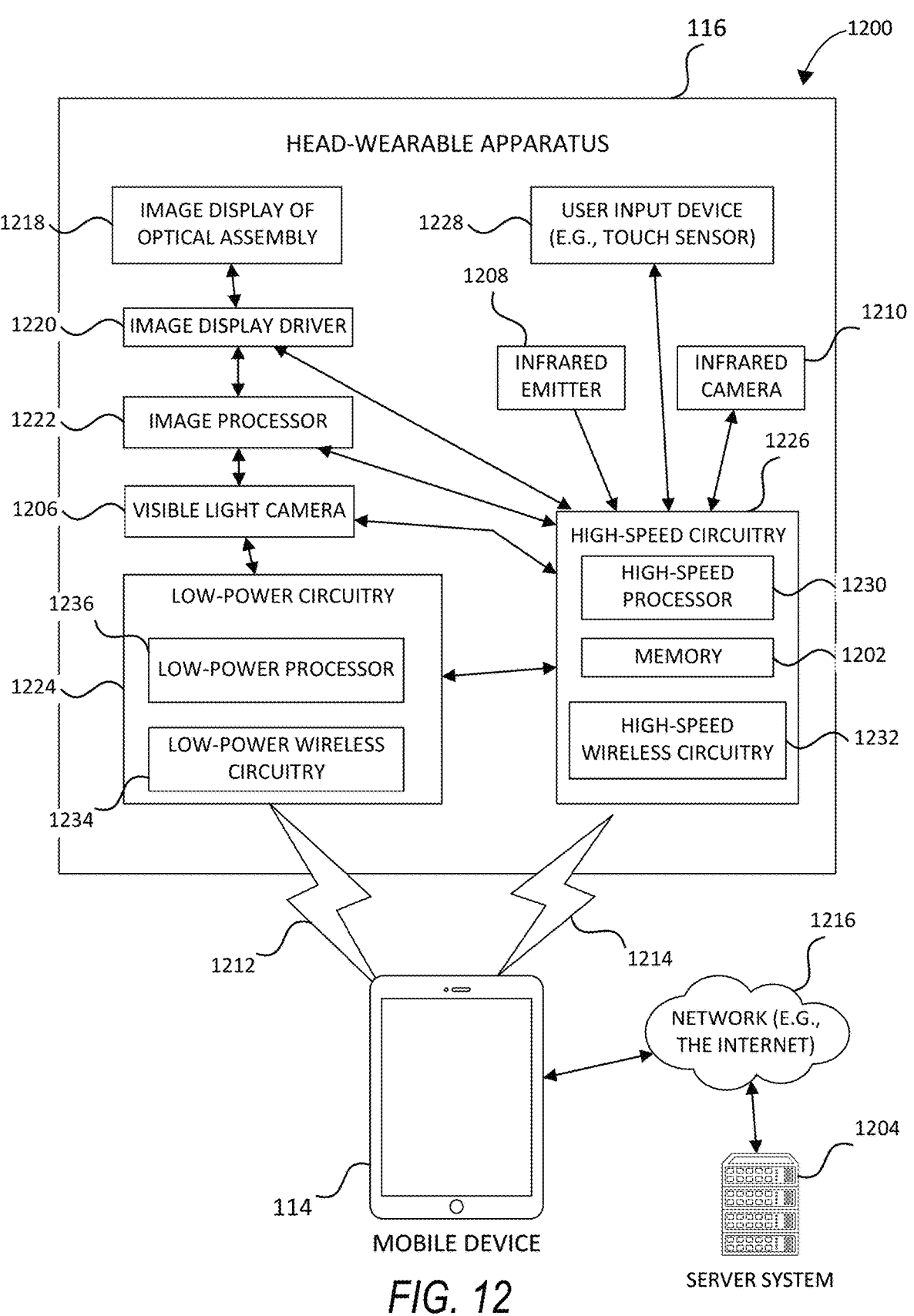
FIG. 12 illustrates a system in which a head-wearable apparatus may be implemented, in accordance with some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 1216.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a GUI, to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as PNG, JPEG, Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the GUI of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

Low-power wireless circuitry 1234 and the high-speed wireless circuitry 1232 of the head-wearable apparatus 136 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 136 can be coupled to the camera (visible light camera 1206; infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the memory of mobile device 114 to implement the functionality described herein.

Output components of the head-wearable apparatus 116 include visual components, such as a display such as a LCD, a PDP, a LED display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or interaction on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multiprocessor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a CDMA connection, a GSM connection, or other types of cellular or wireless coupling. In this example, the coupling may implement any of a variety of types of data transfer technology, such as 1×RTT, EVDO technology, GPRS technology, EDGE technology, 3GPP including 3G, 4G networks, UMTS, HSPA, WiMAX, LTE standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
storing, in a multimodal memory, interaction data representing use of one or more interaction functions including data in different modalities;
detecting an object depicted in an image captured by an interaction client;
generating, by a machine learning model, a prompt based on the object depicted in the image and the interaction data in the multimodal memory;
generating an artificial texture based on the prompt;
modifying a texture of the object depicted in the image using the artificial texture that has been generated based on the prompt;
accessing a fashion item template based on the prompt;
providing the fashion item template to the machine learning model to populate the fashion item template with the artificial texture; and
overlaying the fashion item template populated with the artificial texture on the object depicted in the image.

2. The method of claim 1, wherein the prompt comprises a textual description of a fashion item worn by the object depicted in the image.

3. The method of claim 1, further comprising:
processing the prompt using a generative machine learning model to generate the artificial texture.

4. The method of claim 1, further comprising:
receiving input from the interaction client that specifies one or more parameters of the prompt.

5. The method of claim 1, further comprising:
processing the image to generate a segmentation of a fashion item worn by the object depicted in the image.

6. The method of claim 5, wherein the fashion item worn by the object is replaced with the artificial texture based on the segmentation of the fashion item.

7. The method of claim 1, further comprising:
continuously monitoring speech input received from a user of the interaction client; and
generating the prompt in response to detecting one or more keywords in the speech input.

8. The method of claim 7, wherein the one or more keywords correspond to a fashion item depicted in the image and one or more attributes.

9. The method of claim 8, wherein the one or more attributes comprise a fashion item style, further comprising:

adding to the prompt an identification of the fashion item and a target style corresponding to the fashion item style, wherein the artificial texture comprises an artificial fashion item in the target style.

10. The method of claim 9, further comprising:

identifying one or more preferences of the user based on the interaction data stored in the multimodal memory;

adding to the prompt an indication of the one or more preferences, wherein the artificial texture comprises a representation of the one or more preferences.

11. The method of claim 10, wherein the one or more preferences correspond to a sporting event associated with the user, wherein the fashion item style corresponds to a jersey associated with the sporting event, and wherein the one or more preferences comprise a team associated with the user and the representation comprises a logo of the team.

12. The method of claim 1, further comprising:

generating, by the machine learning model, an annotation representing the prompt; and overlaying the annotation on the image that comprises the object with the modified texture.

13. The method of claim 1, further comprising:

detecting ambiguity in speech input received from a user of the interaction client; and resolving the ambiguity based on the multimodal memory, wherein the prompt is generated in response to resolving the ambiguity in the speech input.

14. The method of claim 1, wherein the fashion item template is generated using a segmentation machine learning model that is applied to the object depicted in the image.

15. The method of claim 14, wherein the segmentation machine learning model is selected from a plurality of segmentation machine learning models based on keywords in the prompt.

16. The method of claim 1, wherein the fashion item template comprises a combination of multiple fashion item templates for different parts of a body, further comprising providing an option for a user to purchase a real-world fashion item corresponding to the fashion item template populated with the artificial texture.

17. The method of claim 16, further comprising:

providing a first of the multiple fashion item templates to the machine learning model to populate the first fashion item template with a first artificial texture;

providing a second of the multiple fashion item templates to the machine learning model to populate the second fashion item template with a second artificial texture; and overlaying the first and second fashion item templates populated with the first and second artificial textures on the object depicted in the image.

18. A system comprising:

at least one processor; and at least one memory component having instructions stored thereon that, when executed by the at least one processor, cause the at least one processor to perform operations comprising:

storing, in a multimodal memory, interaction data representing use of one or more interaction functions including data in different modalities;

detecting an object depicted in an image captured by an interaction client;

generating, by a machine learning model, a prompt based on the object depicted in the image and the interaction data in the multimodal memory;

generating an artificial texture based on the prompt;

modifying a texture of the object depicted in the image using the artificial texture that has been generated based on the prompt;

accessing a fashion item template based on the prompt;

providing the fashion item template to the machine learning model to populate the fashion item template with the artificial texture; and overlaying the fashion item template populated with the artificial texture on the object depicted in the image.

19. A non-transitory computer-readable storage medium having stored thereon instructions that, when executed by at least one processor, cause the at least one processor to perform operations comprising:

storing, in a multimodal memory, interaction data representing use of one or more interaction functions including data in different modalities;

detecting an object depicted in an image captured by an interaction client;

generating, by a machine learning model, a prompt based on the object depicted in the image and the interaction data in the multimodal memory;

generating an artificial texture based on the prompt;

modifying a texture of the object depicted in the image using the artificial texture that has been generated based on the prompt;

accessing a fashion item template based on the prompt;

providing the fashion item template to the machine learning model to populate the fashion item template with the artificial texture; and overlaying the fashion item template populated with the artificial texture on the object depicted in the image.

* * * * *